US008674982B2

(12) United States Patent
Fujiwara

(10) Patent No.: US 8,674,982 B2
(45) Date of Patent: Mar. 18, 2014

(54) INFORMATION PROCESSING SYSTEM, INFORMATION PROCESSING METHOD, INFORMATION PROCESSING PROGRAM, SERVER PROGRAM, SERVER APPARATUS, AND SERVER SYSTEM, CAPABLE OF HANDLING MULTIPLE-VIEW IMAGE DATA

(75) Inventor: Kenshin Fujiwara, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 188 days.

(21) Appl. No.: 13/287,302

(22) Filed: Nov. 2, 2011

(65) Prior Publication Data

US 2013/0050188 A1 Feb. 28, 2013

(30) Foreign Application Priority Data

Aug. 23, 2011 (JP) .................................. 2011-181560

(51) Int. Cl.
*G06T 15/00* (2011.01)
(52) U.S. Cl.
USPC ............................................ 345/419; 348/51
(58) Field of Classification Search
USPC ............................................ 345/419; 348/51
See application file for complete search history.

(56) References Cited

U.S. PATENT DOCUMENTS

| | | | | |
|---|---|---|---|---|
| 6,929,549 | B1* | 8/2005 | Yamada | 463/42 |
| 7,831,659 | B2* | 11/2010 | Endo | 709/203 |
| 7,870,190 | B2* | 1/2011 | Takakura et al. | 709/203 |
| 8,001,210 | B2* | 8/2011 | Minagawa et al. | 709/217 |
| 8,078,674 | B2* | 12/2011 | Ogasawara | 709/203 |
| 8,386,560 | B2* | 2/2013 | Ma et al. | 709/203 |
| 8,438,222 | B2* | 5/2013 | Takakura et al. | 709/203 |
| 2003/0112326 | A1* | 6/2003 | Yoon | 348/46 |
| 2004/0027452 | A1* | 2/2004 | Yun et al. | 348/51 |
| 2004/0264775 | A1* | 12/2004 | Slobodin | 382/174 |
| 2006/0205512 | A1* | 9/2006 | Watanabe et al. | 463/42 |
| 2008/0303842 | A1* | 12/2008 | Okamoto et al. | 345/629 |
| 2010/0063997 | A1* | 3/2010 | Sako et al. | 709/203 |
| 2010/0120528 | A1* | 5/2010 | Mori | 463/29 |
| 2010/0220037 | A1* | 9/2010 | Sako et al. | 345/8 |
| 2012/0177343 | A1* | 7/2012 | Sasaki et al. | 386/248 |
| 2012/0189274 | A1* | 7/2012 | Toma et al. | 386/241 |
| 2012/0304237 | A1* | 11/2012 | Harwell et al. | 725/109 |

FOREIGN PATENT DOCUMENTS

JP 2007-249821 9/2007

* cited by examiner

*Primary Examiner* — Maurice L McDowell, Jr.
(74) *Attorney, Agent, or Firm* — Nixon & Vanderhye PC

(57) ABSTRACT

An exemplary embodiment provides an information processing system. A server apparatus stores multiple-view image data received from a first information processing apparatus, transmits, in response to a request for image transmission from the first information processing apparatus, the stored multiple-view image data to the first information processing apparatus from which the request was made, and transmits, in response to a request for image transmission from a second information processing apparatus, single-view image data generated from the stored multiple-view image data to the second information processing apparatus from which the request was made. The first information processing apparatus provides multiple-view display of an image by using the multiple-view image data from the server apparatus. The second information processing apparatus provides single-view display of an image by using the single-view image data from the server apparatus.

23 Claims, 20 Drawing Sheets

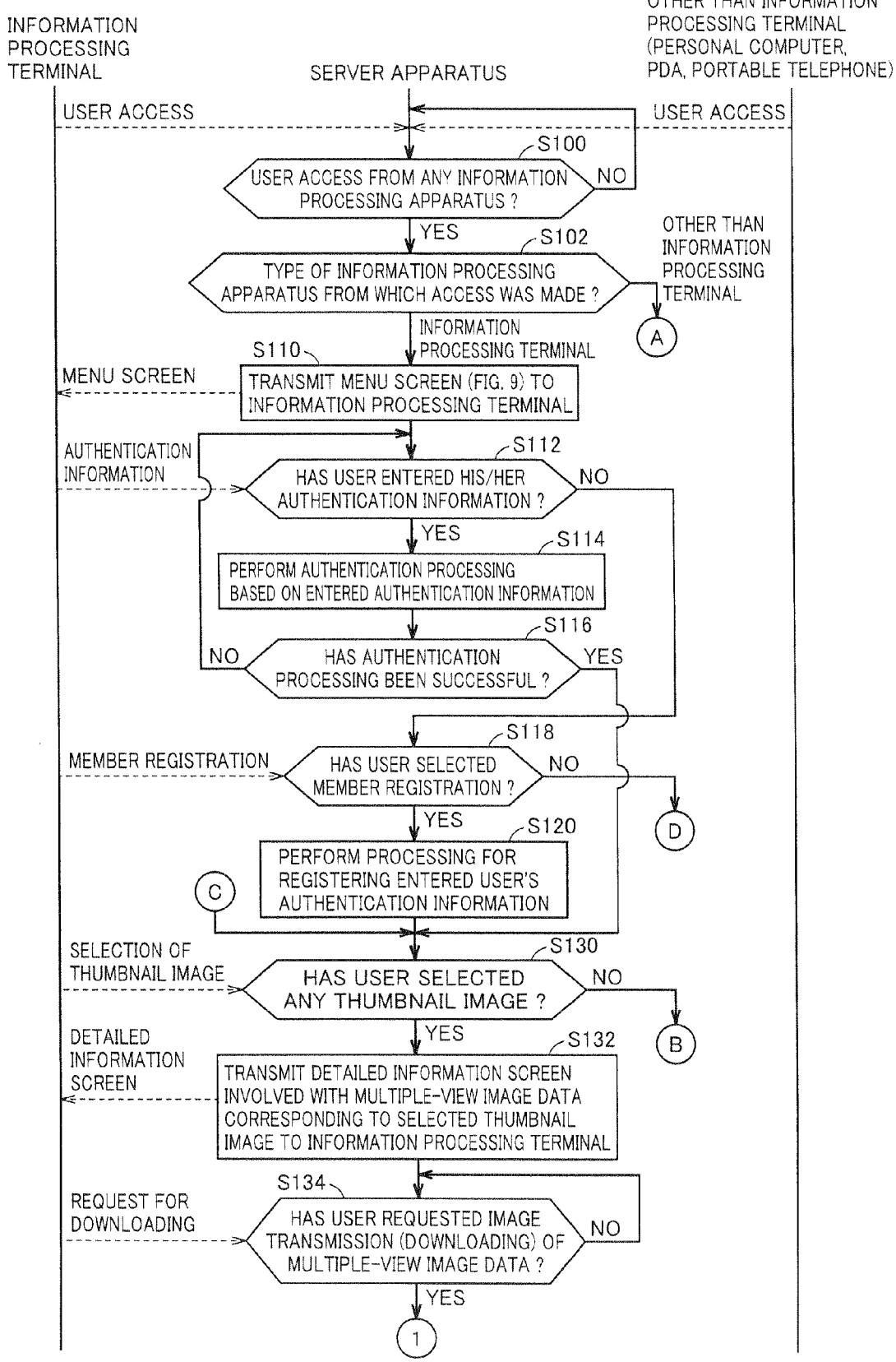

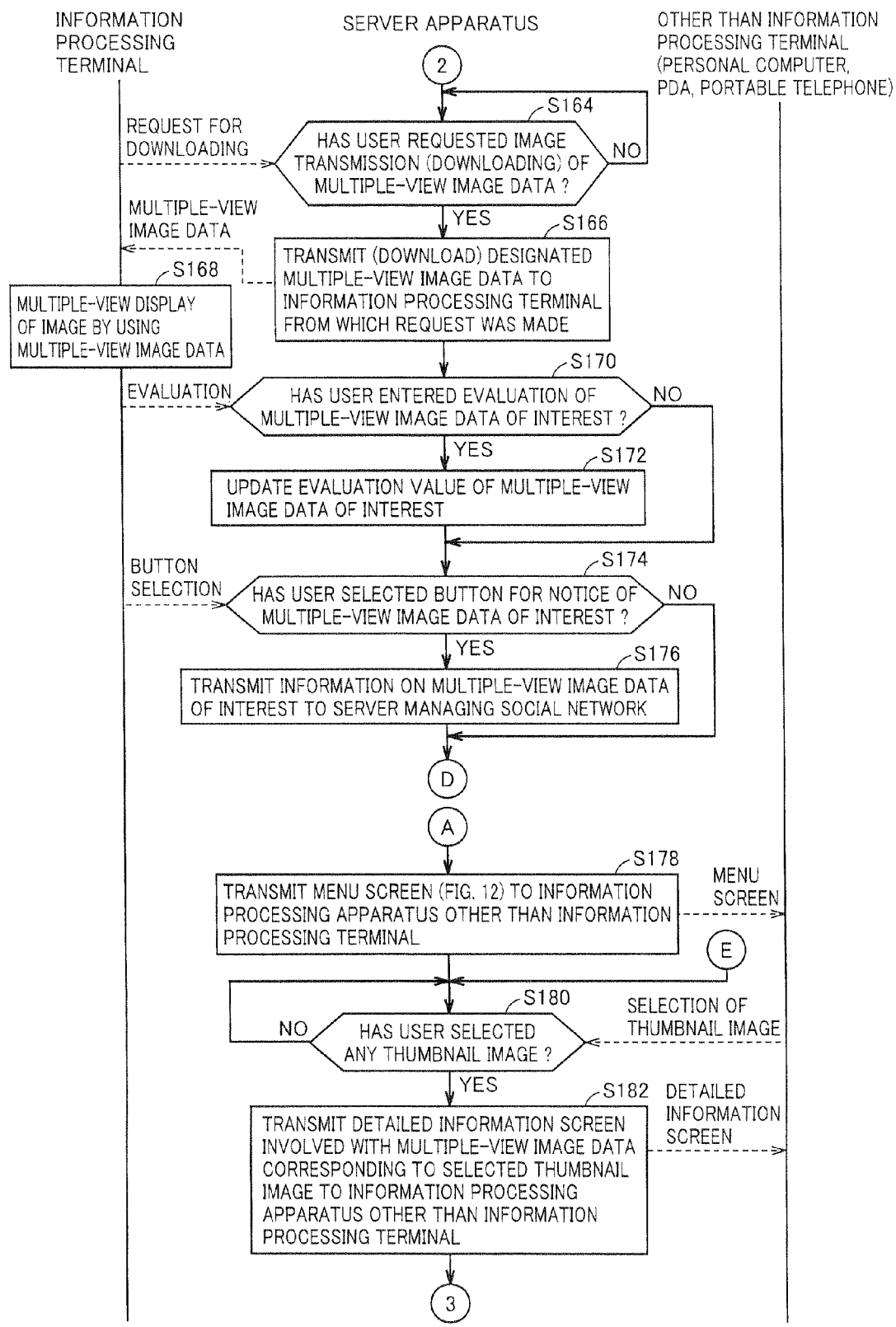

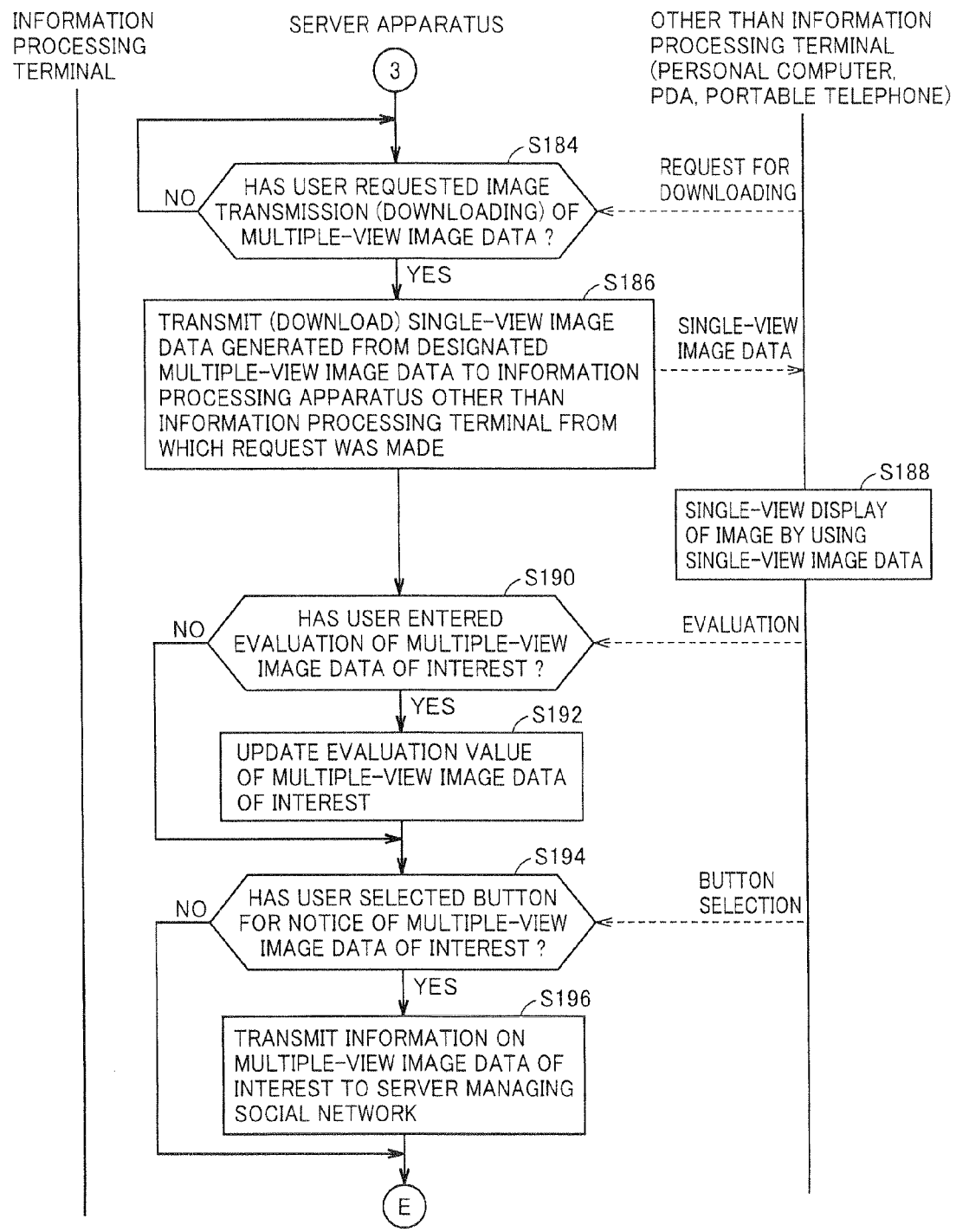

INFORMATION PROCESSING SYSTEM, INFORMATION PROCESSING METHOD, INFORMATION PROCESSING PROGRAM, SERVER PROGRAM, SERVER APPARATUS, AND SERVER SYSTEM, CAPABLE OF HANDLING MULTIPLE-VIEW IMAGE DATA

This nonprovisional application is based on Japanese Patent Application No. 2011-181560 filed with the Japan Patent Office on Aug. 23, 2011, the entire contents of which are hereby incorporated by reference.

FIELD

The invention generally relates to an information processing system, an information processing method, an information processing program, a server program, a server apparatus, and a server system, capable of handling multiple-view image data.

BACKGROUND AND SUMMARY

A sharing system has conventionally been known, in which an image obtained by shooting with shooting means of an information terminal used by a user is transmitted from the information terminal to a server apparatus and the server apparatus is responsible for centralized management of images received from the information terminal. With such a sharing system, a plurality of information terminals can share images.

In a case where images obtained by shooting with the shooting means of the information terminal can be output only on equipment having a specific function, however, bounds within which such images can be shared are restricted to only equipment having such a specific function.

An exemplary embodiment provides an information processing system, an information processing method, an information processing program, a server program, a server apparatus, and a server system, capable of sharing even images having restrictions in terms of equipment on which the images can be output.

In an exemplary embodiment, an information processing system includes a server apparatus, at least one first information processing apparatus capable of communicating with the server apparatus, and at least one second information processing apparatus capable of communicating with the server apparatus. The first information processing apparatus includes a first transmission portion for obtaining multiple-view image data and transmitting the multiple-view image data to the server apparatus. The server apparatus includes a storage portion for storing the multiple-view image data received from the first information processing apparatus, and a second transmission portion for transmitting, in response to a request for image transmission from the first information processing apparatus, the stored multiple-view image data to the first information processing apparatus from which the request was made, and transmitting, in response to a request for image transmission from the second information processing apparatus, single-view image data generated from the stored multiple-view image data to the second information processing apparatus from which the request was made. The first information processing apparatus includes a first display portion for providing multiple-view display of an image by using the multiple-view image data from the server apparatus. The second information processing apparatus includes a second display portion for providing single-view display of an image by using the single-view image data from the server apparatus.

According to the exemplary embodiment, the server apparatus receives and stores the multiple-view image data from the first information processing apparatus, transmits, in response to a request for image transmission from the first information processing apparatus, the requested multiple-view image data to the first information processing apparatus, and transmits, in response to a request for image transmission from the second information processing apparatus, single-view image data generated from the requested multiple-view image data to the second information processing apparatus. Then, the first information processing apparatus provides multiple-view display of an image by using the multiple-view image data from the server apparatus, and the second information processing apparatus provides single-view display of an image by using the single-view image data from the server apparatus.

Thus, the user can view an image in multiple-view display on the first information processing apparatus having a multiple-view display function, while the user can view an image in single-view display on the second information processing apparatus having a single-view display function. Even an image having restrictions in terms of equipment on which the image can be output, such as multiple-view image data, can be shared by respective users who use the first information processing apparatus and the second information processing apparatus. Since the multiple-view image data can be shared among a number of users without depending on a model of such an information processing apparatus, an information conveyance effect through what is called word of mouth can effectively be utilized.

In an exemplary embodiment, the server apparatus further includes a restriction unit for restricting reception of at least the multiple-view image data from the second information processing apparatus.

According to the exemplary embodiment, by restricting transmission of the multiple-view image data by the second information processing apparatus essentially not having a function to obtain multiple-view image data, image data to be stored in the server apparatus can be only image data obtained by the first information processing apparatus. Thus, the user who accesses the server apparatus can enjoy the multiple-view image data. In addition, the user who uses the second information processing apparatus can potentially be invited to use the first information processing apparatus.

In an exemplary embodiment, the restriction unit determines, in response to access from any of the first information processing apparatus and the second information processing apparatus, whether or not to restrict reception of at least the multiple-view image data from the information processing apparatus from which access was made, based on identification information associated with the information processing apparatus from which access was made.

According to the exemplary embodiment, since the restriction unit determines whether or not to restrict reception of image data from an information processing apparatus based on identification information associated with the information processing apparatus from which access was made, the user does not have to enter a type or the like of the information processing apparatus used by himself/herself.

In an exemplary embodiment, the restriction unit determines, in response to access from any of the first information processing apparatus and the second information processing apparatus, whether or not to restrict reception of at least the multiple-view image data from the information processing apparatus from which access was made, based on identification information of a web browser of the information processing apparatus which made access.

According to the exemplary embodiment, since the restriction unit makes determination based on identification information provided by a web browser of an information processing apparatus, determination as to whether or not to restrict reception of the multiple-view image data can be made based on versatile data.

In an exemplary embodiment, the restriction unit allows transmission to the first information processing apparatus, in response to access from the first information processing apparatus, of data for displaying a screen involved with image transmission to the server apparatus and image obtainment from the server apparatus by the first information processing apparatus, and allows transmission to the second information processing apparatus, in response to access from the second information processing apparatus, of data for displaying a screen involved with image obtainment from the server apparatus by the second information processing apparatus.

According to the exemplary embodiment, a screen involved with image transmission to the server apparatus and image obtainment from the server apparatus is presented to the user who uses the first information processing apparatus, and a screen involved with image obtainment from the server apparatus is presented to the user who uses the second information processing apparatus. Namely, a screen for image transmission to the server apparatus in addition to image obtainment from the server apparatus is presented to the user who uses the first information processing apparatus capable of transmitting multiple-view image data to the server apparatus, and a screen for image obtainment from the server apparatus is presented to the user who uses the second information processing apparatus restricted in transmission of an image to the server apparatus. Thus, a user interface in accordance with a function of an information processing apparatus used can be provided to the user.

In an exemplary embodiment, the server apparatus further includes an authentication unit for performing authentication processing based on authentication information through the first information processing apparatus, and the restriction unit permits reception only of the multiple-view image data from the first information processing apparatus approved by the authentication unit.

According to the exemplary embodiment, since only the multiple-view image data from the first information processing apparatus approved by the authentication unit is received, transmission of multiple-view image data by an unspecified number of users to the server apparatus can be suppressed. Thus, quality of the multiple-view image data provided by the server apparatus can potentially be maintained.

In an exemplary embodiment, the restriction unit permits the first information processing apparatus to register the authentication information and does not permit the second information processing apparatus to register the authentication information.

According to the exemplary embodiment, since the second information processing apparatus essentially prohibited to transmit image data is not permitted to register authentication information per se, unnecessary processing by the user of the second information processing apparatus can be avoided. In addition, authentication strength can further be enhanced.

In an exemplary embodiment, the restriction unit allows transmission, to the first information processing apparatus, of data for displaying a log-in screen for performing authentication processing based on authentication information, while it does not allow transmission, to the second information processing apparatus, of the data for displaying the log-in screen.

According to the exemplary embodiment, since a log-in screen is displayed only to the user who uses the first information processing apparatus that can be permitted to transmit an image, unnecessary processing by the user of the second information processing apparatus can be avoided. In addition, authentication strength can further be enhanced.

In an exemplary embodiment, the single-view image data is lower in resolution than corresponding multiple-view image data.

According to the exemplary embodiment, by transmitting image data lower in resolution to the second information processing apparatus essentially not having a multiple-view display function, the user who uses the second information processing apparatus can potentially be invited to use the first information processing apparatus.

In an exemplary embodiment, the server apparatus further includes an evaluation accepting unit for accepting a result of evaluation of an image shown by the stored multiple-view image data, and the second transmission portion allows only single-view image data corresponding to the multiple-view image data of which evaluation has been entered through the evaluation accepting unit, among the stored multiple-view image data, to be transmitted to the second information processing apparatus.

According to the exemplary embodiment, transmission to the second information processing apparatus, of only multiple-view image data viewed in a state of multiple-view display by the user, on which the user made some kind of evaluation, among the multiple-view image data stored in the server apparatus, is allowed. Thus, only the multiple-view image data evaluated by the user who uses the first information processing apparatus can be spread to a user who uses the second information processing apparatus.

In an exemplary embodiment, the server apparatus further includes a generation unit for generating, when a request for image transmission is received from the second information processing apparatus, corresponding single-view image data from the requested multiple-view image data.

According to the exemplary embodiment, since it is not necessary to generate single-view image data in advance, resources necessary for storage of multiple-view image data can be reduced.

In an exemplary embodiment, the server apparatus further includes a generation unit for generating, when the multiple-view image data is received from the first information processing apparatus, single-view image data corresponding to the multiple-view image data, the storage portion stores the multiple-view image data and the corresponding single-view image data in association with each other, and the second transmission portion transmits, in response to a request for image transmission from the second information processing apparatus, the single-view image data stored in association with the multiple-view image data to the second information processing apparatus from which the request was made.

According to the exemplary embodiment, since single-view image data has been generated before a request for image transmission from the second information processing apparatus is received, responsiveness to the request for image transmission can be enhanced.

In an exemplary embodiment, the first information processing apparatus further includes a plurality of image pick-up portions for obtaining multiple-view image data, and the first transmission portion transmits the multiple-view image data obtained by the plurality of image pick-up portions to the server apparatus.

According to the exemplary embodiment, the first information processing apparatus can generate the multiple-view image data by itself, by using a plurality of image pick-up portions mounted on the apparatus itself. Thus, the user who utilizes the first information processing apparatus can transmit multiple-view image data to be shared to the server apparatus in a more simplified procedure.

An exemplary embodiment provides an information processing method in a system including a server apparatus and at least one first information processing apparatus and at least one second information processing apparatus each capable of communicating with the server apparatus. The information processing method includes a first transmission step in which the first information processing apparatus obtains multiple-view image data and transmits the multiple-view image data to the server apparatus, a storage step in which the server apparatus stores the multiple-view image data received from the first information processing apparatus, a second transmission step in which the server apparatus transmits, in response to a request for image transmission from the first information processing apparatus, the stored multiple-view image data to the first information processing apparatus from which the request was made, and transmits, in response to a request for image transmission from the second information processing apparatus, single-view image data generated from the stored multiple-view image data to the second information processing apparatus from which the request was made, a first display step in which the first information processing apparatus provides multiple-view display of an image by using the multiple-view image data from the server apparatus, and a second display step in which the second information processing apparatus provides single-view display of an image by using the single-view image data from the server apparatus.

An exemplary embodiment provides a non-transitory storage medium encoded with a computer readable information processing program and executable by a system, and the system includes a server apparatus and at least one first information processing apparatus and at least one second information processing apparatus each capable of communicating with the server apparatus. The information processing program includes first transmission instructions for causing the first information processing apparatus to obtain multiple-view image data and transmit the multiple-view image data to the server apparatus, storage instructions for causing the server apparatus to store the multiple-view image data received from the first information processing apparatus, second transmission instructions for causing the server apparatus to transmit, in response to a request for image transmission from the first information processing apparatus, the stored multiple-view image data to the first information processing apparatus from which the request was made, and causing the server apparatus to transmit, in response to a request for image transmission from the second information processing apparatus, single-view image data generated from the stored multiple-view image data to the second information processing apparatus from which the request was made, first display instructions for causing the first information processing apparatus to provide multiple-view display of an image by using the multiple-view image data from the server apparatus, and second display instructions for causing the second information processing apparatus to provide single-view display of an image by using the single-view image data from the server apparatus.

An exemplary embodiment provides a non-transitory storage medium encoded with a computer readable server program and executable by a server apparatus, and the server apparatus is capable of communicating with at least one first information processing apparatus and at least one second information processing apparatus. The server program includes storage instructions for receiving from the first information processing apparatus, multiple-view image data obtained and transmitted to the server apparatus by the first information processing apparatus, and storing the multiple-view image data, and second transmission instructions for transmitting, in response to a request for image transmission from the first information processing apparatus, the stored multiple-view image data to the first information processing apparatus from which the request was made, and transmitting, in response to a request for image transmission from the second information processing apparatus, single-view image data generated from the stored multiple-view image data to the second information processing apparatus from which the request was made.

An exemplary embodiment provides a server apparatus capable of communicating with at least one first information processing apparatus and at least one second information processing apparatus. The server apparatus includes a storage portion for receiving from the first information processing apparatus, multiple-view image data obtained and transmitted to the server apparatus by the first information processing apparatus, and storing the multiple-view image data, and a second transmission portion for transmitting, in response to a request for image transmission from the first information processing apparatus, the stored multiple-view image data to the first information processing apparatus from which the request was made, and transmitting, in response to a request for image transmission from the second information processing apparatus, single-view image data generated from the stored multiple-view image data to the second information processing apparatus from which the request was made.

An exemplary embodiment provides a server system constituted of at least one processing entity, and the server system is capable of communicating with at least one first information processing apparatus and at least one second information processing apparatus. The server system includes a storage portion for receiving from the first information processing apparatus, multiple-view image data obtained and transmitted to the server system by the first information processing apparatus, and storing the multiple-view image data, and a second transmission portion for transmitting, in response to a request for image transmission from the first information processing apparatus, the stored multiple-view image data to the first information processing apparatus from which the request was made, and transmitting, in response to a request for image transmission from the second information processing apparatus, single-view image data generated from the stored multiple-view image data to the second information processing apparatus from which the request was made.

An exemplary embodiment provides an information processing method in a server apparatus capable of communicating with at least one first information processing apparatus and at least one second information processing apparatus. The information processing method includes a storage step of receiving from the first information processing apparatus, multiple-view image data obtained and transmitted to the server apparatus by the first information processing apparatus, and storing the multiple-view image data, and a second transmission step of transmitting, in response to a request for image transmission from the first information processing apparatus, the stored multiple-view image data to the first information processing apparatus from which the request was made, and transmitting, in response to a request for image transmission from the second information processing apparatus, single-view image data generated from the stored multiple-view image data to the second information processing apparatus from which the request was made.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 17A to 17D each show an exemplary non-limiting flowchart showing a processing procedure performed in the information processing system according to the exemplary embodiment.

DETAILED DESCRIPTION OF NON-LIMITING EXAMPLE EMBODIMENTS

Figure 1:
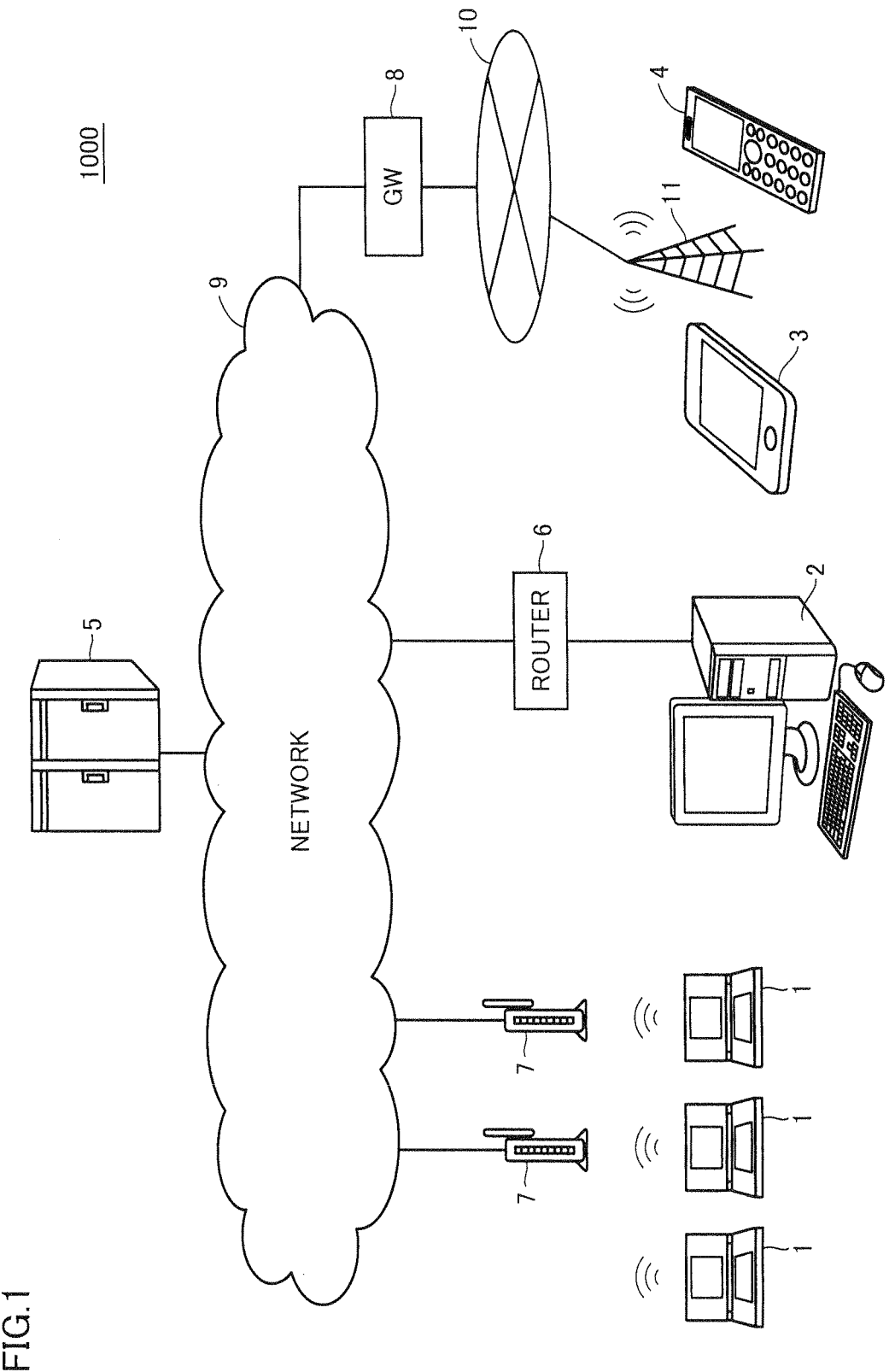
FIG. 1 shows an exemplary illustrative non-limiting schematic diagram of an exemplary non-limiting information processing system according to an exemplary embodiment.

Some embodiments will be described in detail with reference to the drawings. The same or corresponding elements in the drawings have the same reference characters allotted and description thereof will not be repeated.

A. Definition

A "multiple-view image" herein refers to an image obtained by picking up an image of a subject from a plurality of viewpoints and "multiple-view image data" refers to data necessary for constituting/outputting/reproducing a "multiple-view image". Examples of such a "multiple-view image" include a stereoscopic image (typically, a stereo image formed of data of two images) obtained by picking up an image of a subject with a plurality of cameras provided with prescribed parallax, a panorama image obtained by connecting a plurality of images with one another that are obtained by picking up images of different fields of view, and the like, without being limited as such. It is noted that a "multiple-view image" may include both of a still image and a motion picture.

In addition, "multiple-view display" herein refers to such a display manner that substantially entire image information associated with each viewpoint included in the "multiple-view image" as described above can be enjoyed by a user. In a case where a multiple-view image is a stereoscopic image, "multiple-view display" encompasses such display that, by displaying with prescribed parallax corresponding stereoscopic image data on a display capable of providing stereoscopic display, the user can stereoscopically visually recognize a subject included therein. Alternatively, in a case where a multiple-view image is a panorama image, "multiple-view display" encompasses such display that, by displaying respective images based on relation among fields of view at the time of image pick-up, the user can enjoy an image of a field of view wider than a field of view of which image can be picked up by a single camera.

In contrast, a "single-view image" herein is a term having a concept paired with the "multiple-view image" described above, and it refers to an image obtained by picking up an image of a subject from a single viewpoint. "Single-view image data" refers to data necessary for constituting/outputting/reproducing a "single-view image". Such a "single-view image" is typically an image (a still image or a motion picture) that can be obtained by a single camera (an image pick-up element), although not limited as such. Therefore, obtainment and display of a "single-view image" can be achieved with the use of a versatile apparatus (device).

B. System Configuration

By way of example of a certain embodiment, an information processing system 1000 in which a portable information processing terminal 1, a versatile personal computer 2, a PDA (Personal Digital Assistant) 3, a portable telephone 4, and the like share image data through a server apparatus 5 will be described below. Information processing terminal 1, personal computer 2, PDA 3, and portable telephone 4 each represent one example of an information processing apparatus, and any of them can communicate with server apparatus 5. It is noted that an information processing apparatus participating in the information processing system according to the present embodiment is not limited to the examples described above, and a portable game device, a stationary game device, a smartphone, a television apparatus equipped with an information processing function, and the like can be adopted.

Information processing terminal 1 has a plurality of image pick-up portions (details of which will be described later) and can transmit multiple-view image data obtained by the plurality of image pick-up portions to server apparatus 5 and provide multiple-view display of an image also on the terminal itself by using the multiple-view image data. In the present embodiment, multiple-view display is assumed as stereoscopic display for displaying an image with stereoscopic effect, while single-view display is assumed as two-dimensional display for providing two-dimensional display of an image as in a conventional example. It is noted that stereoscopic display is expressed as "3D" or "3D display", while two-dimensional display is expressed as "2D" or "2D display".

In information processing system 1000 shown in FIG. 1, each of information processing terminal 1, personal computer 2, PDA 3, and portable telephone 4 can access server apparatus 5 through a network 9. Network 9 is a wide area network (WAN) such as the Internet or a leased circuit, although the network is not limited as such.

More specifically, information processing terminal 1 has a wireless communication function as will be described later, and exchanges data with server apparatus 5 through an access point 7 electrically connected to network 9. In addition, personal computer 2 exchanges data with server apparatus 5 through a router 6 electrically connected to network 9.

In contrast, PDA 3 and portable telephone 4 exchange data with server apparatus 5 through a public wireless communication network. More specifically, a public communication network 10 owned by a telecommunication carrier is connected to network 9 through a gateway (GW) 8. A plurality of base stations 11 are electrically connected to public communication network 10. Base station 11 exchanges data through a wireless signal with PDA 3 or portable telephone 4 present in an area (cell) under the control of the base station itself. Thus, PDA 3 and portable telephone 4 exchange data with server apparatus 5 through base station 11, public communication network 10, gateway 8, and network 9.

C. Overall Procedure Involved with Image Sharing

An overall procedure involved with image sharing in information processing system 1000 according to the present embodiment will now be described.

Figure 2:
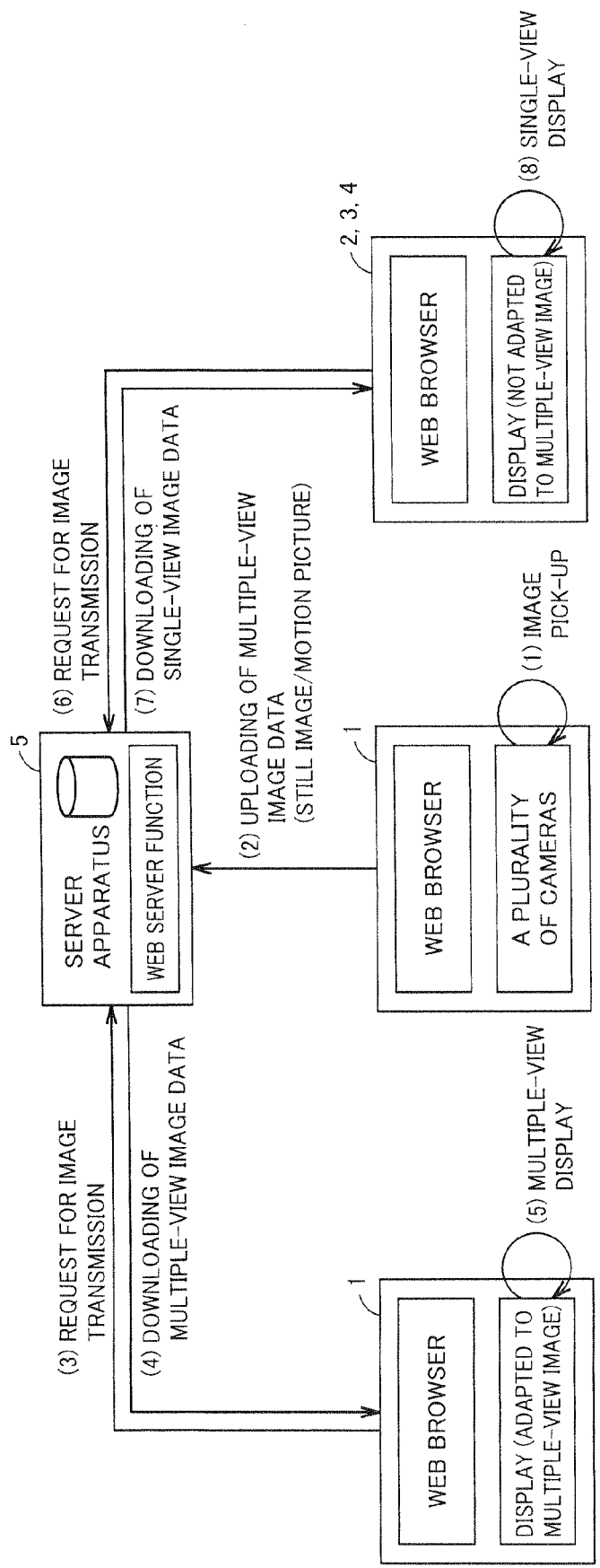
FIG. 2 shows an exemplary illustrative non-limiting schematic diagram showing an overall procedure involved with image sharing in the information processing system according to the exemplary embodiment.

Referring to FIG. 2, server apparatus 5 provides a function for sharing a multiple-view image among information processing apparatuses. Information processing system 1000 provides a scheme for sharing an image without depending on a function (capability) of each information processing apparatus.

More specifically, server apparatus 5 receives from information processing terminal 1, a multiple-view image obtained by an image pick-up portion mounted on information processing terminal 1 and stores the multiple-view image. In addition, server apparatus 5 transmits, in response to a request for image transmission not only from information processing terminal 1 but also from personal computer 2, PDA 3, portable telephone 4, and the like, designated image data to the information processing apparatus from which the request was made. Depending on a function (capability) of the information processing apparatus from which the request for image transmission was made, server apparatus 5 transmits a single-view image generated from a multiple-view image, instead of the multiple-view image, to the information processing apparatus from which the request was made. Processing involved with image sharing in a case where information processing terminal 1 is used and processing involved with image sharing in a case where personal computer 2, PDA 3, or portable telephone 4 is used will be described hereinafter with reference to FIG. 2.

(1) Image Pick-Up

Initially, the user who uses information processing terminal 1 uses the plurality of image pick-up portions (cameras) mounted on information processing terminal 1 to pick up an image of a subject to thereby obtain multiple-view image data. It is noted that, in such a case that an application making use of multiple-view image data is being executed in information processing terminal 1, a hard copy (a screen shot) of the application may be obtained as the multiple-view image data.

(2) Uploading of Multiple-View Image

In succession, as the user operates information processing terminal 1, the obtained multiple-view image data is uploaded to server apparatus 5. Namely, information processing terminal 1 obtains and transmits the multiple-view image data to server apparatus 5. Server apparatus 5 stores the multiple-view image data received from information processing terminal 1.

(3) Request for Image Transmission

It is assumed that the user of information processing terminal 1 (which may be the same as information processing terminal 1 from which the multiple-view image has been uploaded or may be another information processing terminal 1) has operated information processing terminal 1 and requested image transmission to server apparatus 5. It is noted that information processing terminal 1 can make use of a display adapted to a multiple-view image.

Typically, a web browser is executed on information processing terminal 1, and the request for image transmission is conveyed to server apparatus 5 through a user interface provided by this web browser. An example of this user interface will be described later. A method of conveying a request for image transmission from information processing terminal 1 to server apparatus 5 is not limited to a web browser, and a form of making use of versatile communication software or dedicated communication software may also be applicable. Further, such means as FTP (File Transfer Protocol) may be employed.

(4) Downloading of Multiple-View Image Data

When image transmission is requested from information processing terminal 1, server apparatus 5 starts downloading of designated multiple-view image data. Namely, in response to the request for image transmission from information processing terminal 1, server apparatus 5 transmits the stored multiple-view image data to information processing terminal 1 from which the request was made.

(5) Multiple-View Display

When information processing terminal 1 receives the multiple-view image data from server apparatus 5, it displays the multiple-view image data on a display adapted to a multiple-view image. Namely, information processing terminal 1 provides multiple-view display of an image by using the multiple-view image data from server apparatus 5. As described above, in the present embodiment, information processing terminal 1 provides stereoscopic display of an image by using the multiple-view image data.

Processing in (3) to (5) described above is processing in a case where server apparatus 5 is accessed by information processing terminal 1. Processing (processing in (6) to (8)) in a case where server apparatus 5 is accessed by personal computer 2, PDA 3, or portable telephone 4 will now be described.

(6) Request for Image Transmission

It is assumed that the user of personal computer 2, PDA 3, or portable telephone 4 has operated any apparatus and requested image transmission to server apparatus 5. It is noted that information processing terminal 1 is assumed to be able to make use of a display adapted to a single-view image, rather than a display adapted to a multiple-view image.

Typically, as in information processing terminal 1 described above, a web browser is executed also in these information processing apparatuses, and a request for image transmission is conveyed to server apparatus 5 through a user interface provided by this web browser. An example of this user interface will be described later. A method of conveying a request for image transmission from the user of personal computer 2, PDA 3, or portable telephone 4 to server apparatus 5 is not limited to a web browser, and a form of making use of versatile communication software or dedicated communication software may also be applicable. Further, such means as FTP may be employed.

(7) Downloading of Single-View Image Data

When a request for image transmission is made from personal computer 2, PDA 3, or portable telephone 4, server apparatus 5 starts downloading of a single-view image corresponding to the designated multiple-view image data. Namely, in response to the request for image transmission from personal computer 2, PDA3, or portable telephone 4, server apparatus 5 transmits single-view image data generated from the stored multiple-view image data to the information processing apparatus from which the request was made. A method of generating single-view image data to be transmitted by server apparatus 5 to the information processing apparatus from which the request was made should only be designed as appropriate.

(8) Single-View Display

When personal computer 2, PDA 3, or portable telephone 4 receives the single-view image data from server apparatus 5, it displays the single-view image data on a display not adapted to a multiple-view image (adapted only to a single-view image). Namely, personal computer 2, PDA 3, or portable telephone 4 provides single-view display of an image by using the single-view image data from server apparatus 5.

As described above, in information processing system 1000 according to the present embodiment, server apparatus 5 stores the uploaded multiple-view image data, and when any of the stored pieces of multiple-view image data is requested from an information processing apparatus, server apparatus 5 downloads any one of the multiple-view image data and the single-view image data to the information processing apparatus from which the request was made, in accordance with a function of the information processing apparatus from which the request was made. By adopting such a scheme, even a multiple-view image having restrictions in terms of equipment on which the image can be output can be shared.

In addition, in information processing system 1000 according to the present embodiment, a terminal that can upload multiple-view image data to server apparatus 5 is restricted to information processing terminal 1 capable of generating multiple-view image data. Namely, even if personal computer 2, PDA 3, portable telephone 4, and the like can obtain multiple-view image data, they are restricted in uploading multiple-view image data to server apparatus 5.

D. Hardware Configuration of Information Processing Apparatus

A hardware configuration of the information processing apparatus included in information processing system 1000 according to the present embodiment will now be described.

(d1: Information Processing Terminal 1)

Figure 3:
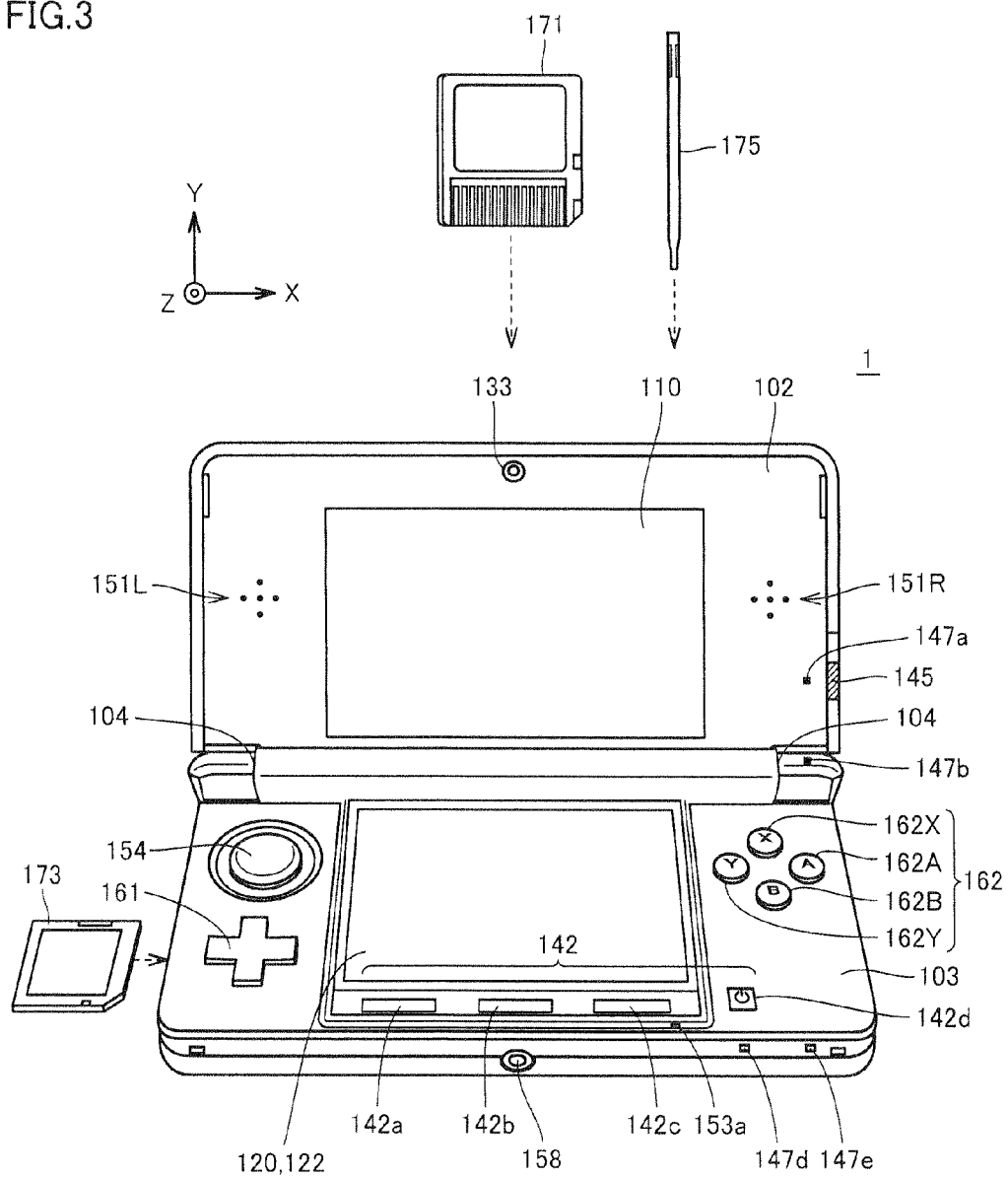
FIG. 3 shows an exemplary non-limiting front view of an information processing terminal (in an opened state) according to the exemplary embodiment.
Figure 4D:
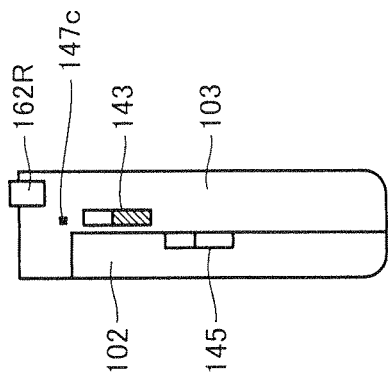
FIGS. 4A to 4D show exemplary non-limiting projection views with an upper surface side of the information processing terminal shown in FIG. 3 being the center.
Figure 4A:
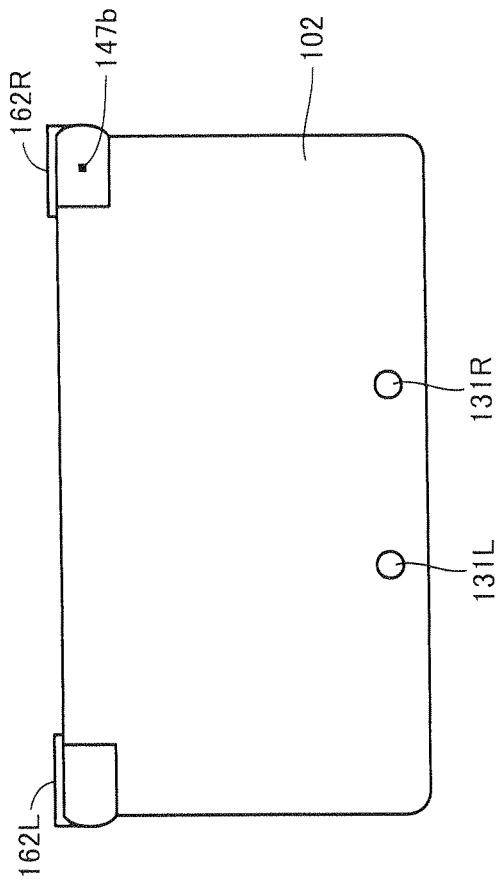
Figure 4B:
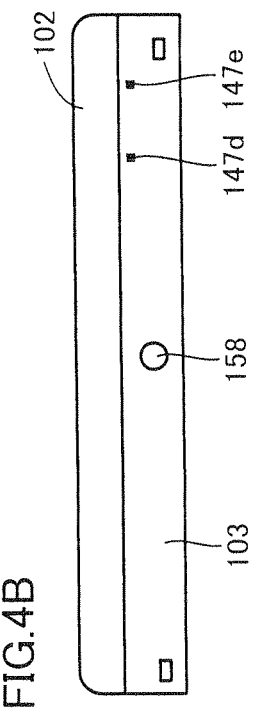
Figure 4C:
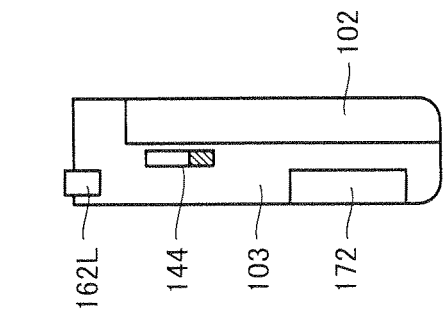
Figure 5B:
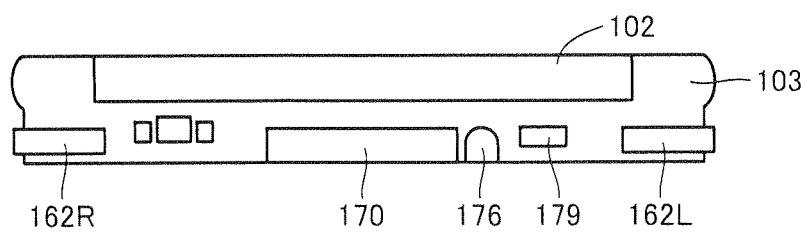
FIGS. 5A and 5B show exemplary non-limiting projection views with a bottom surface side of the information processing terminal shown in FIG. 3 being the center.
Figure 5A:
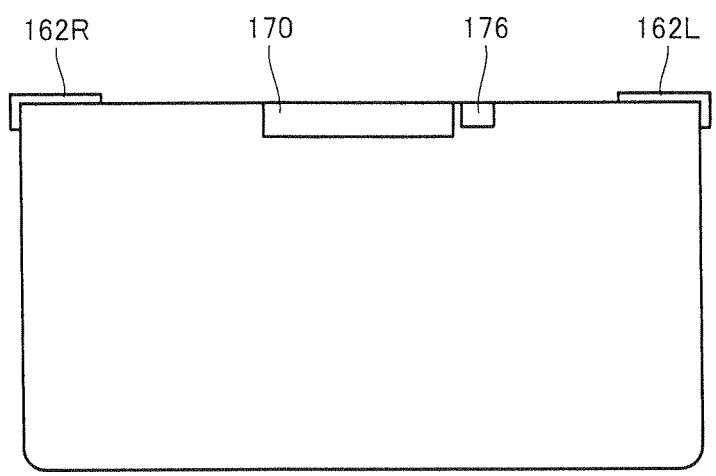

FIG. 3 is a front view of information processing terminal 1 (in an opened state). FIG. 4A shows a top view of information processing terminal 1 (in a closed state), FIG. 4B shows a front view of information processing terminal 1, FIG. 4C shows a left side view of information processing terminal 1, and FIG. 4D shows a right side view of information processing terminal 1. FIG. 5A shows a bottom view of information processing terminal 1 and FIG. 5B shows a rear view of information processing terminal 1.

Referring to FIGS. 3 to 6, information processing terminal 1 according to the present embodiment has an upper housing 102 and a lower housing 103 and it is configured to be foldable. Appearance of information processing terminal 1 in an opened state is as shown in FIG. 3, and appearance thereof in a closed state is as shown in FIG. 4A.

In upper housing 102, an upper LCD (Liquid Crystal Display) 110 capable of providing stereoscopic display is provided as a display portion (display means) capable of providing multiple-view display. A parallax barrier type display device can be adopted as a specific mount example of upper LCD 110. In a case where such a parallax barrier type display device is employed, the user can enjoy stereoscopic display with his/her naked eyes. A lenticular type display device can also be adopted as an alternative configuration. With this type, a display area for an image for left eye and a display area for an image for right eye are arranged in a certain pattern (typically, alternately). Alternatively, as in a method of using shutter glasses (a time division type), a display device alternately displaying an image for left eye and an image for right eye with a display area for an image for left eye and a display area for an image for right eye being common can also be adopted.

In addition, upper housing 102 is provided with a plurality of image pick-up portions (cameras) for obtaining multiple-view image data by picking up an image of a subject. More specifically, a pair of outer cameras 131L and 131R (see FIG. 4A) is provided in upper housing 102. The pair of outer cameras 131L and 131R is arranged at a prescribed distance from each other, and stereo image data representing one example of multiple-view image data is obtained from a pair of pieces of image data obtained by image pick-up by outer cameras 131L and 131R. This pair of pieces of image data (stereo image data) has prescribed parallax in accordance with relative positional relation between outer camera 131L and outer camera 131R. Therefore, a subject can stereoscopically be displayed with the use of the pair of pieces of image data obtained by these outer cameras 131L and 131R. Outer cameras 131L and 131R function as what is called stereo cameras.

Upper housing 102 is also provided with an inner camera 133 (see FIG. 3) for generating single-view image data by picking up an image of a subject. Single-view image data generated by this inner camera 133 is used for single-view display.

In addition, in upper housing 102, stereoscopic vision volume 145 used for adjusting a degree of stereoscopic effect (parallax and intensity) of stereoscopic display on upper LCD 110 and sound emission holes 151L and 151R communicating with a speaker (a speaker 151 shown in FIG. 6) serving as an audio generation device (audio generation portion) are provided.

Meanwhile, a lower LCD 120 is provided in lower housing 103. Though a display portion (display means) capable of providing multiple-view display as described above may be adopted as lower LCD 120, in the present embodiment, a common display device for providing single-view display (non-stereoscopic display/planar display) of an object, various types of information or the like is adopted. Therefore, for example, a display using EL (Electro Luminescence) may be adopted as lower LCD 120. In association with this lower LCD 120, a touch panel 122 representing a pointing device for accepting a user's operation is provided. A pointing operation onto touch panel 122 is normally performed by the user with the use of a stylus 175. As shown in FIGS. 3 and 5B, an accommodation portion 176 for stylus 175 is provided in a rear surface of lower housing 103.

In lower housing 103, a control pad 154, a cross-shaped button 161, and button groups 142, 162 are provided as input portions (input devices) for accepting an input operation from a user or the like. Button group 142 includes a select button 142a, a HOME button 142b, a start button 142c, and a power button 142d. Button group 162 includes an X button 162X, a Y button 162Y, an A button 162A, and a B button 162B.

Further, in lower housing 103, a microphone hole 153a communicating with a microphone serving as an audio obtaining device (audio obtaining portion) and a connection terminal 158 for connecting a headphone and/or a microphone are provided.

As shown in FIGS. 4C, 4D, 5A, and 5B, an L button 162L is provided at a left end portion of the rear surface of lower housing 103, and an R button 162R is provided at a right end portion of the rear surface of lower housing 103.

As shown in FIG. 4C, sound volume 144 is provided on a left side surface of lower housing 103, and as shown in FIG. 4D, a wireless switch 143 is provided on a right side surface of lower housing 103.

A game card 171 and/or a memory card 173 can be attached to information processing terminal 1. More specifically, as shown in FIG. 5B, a game card slot 170 for attaching game card 171 is provided in the rear surface of lower housing 103. As shown in FIG. 4C, a memory card slot 172 for attaching memory card 173 is provided in the left side surface of lower housing 103.

Figure 6:
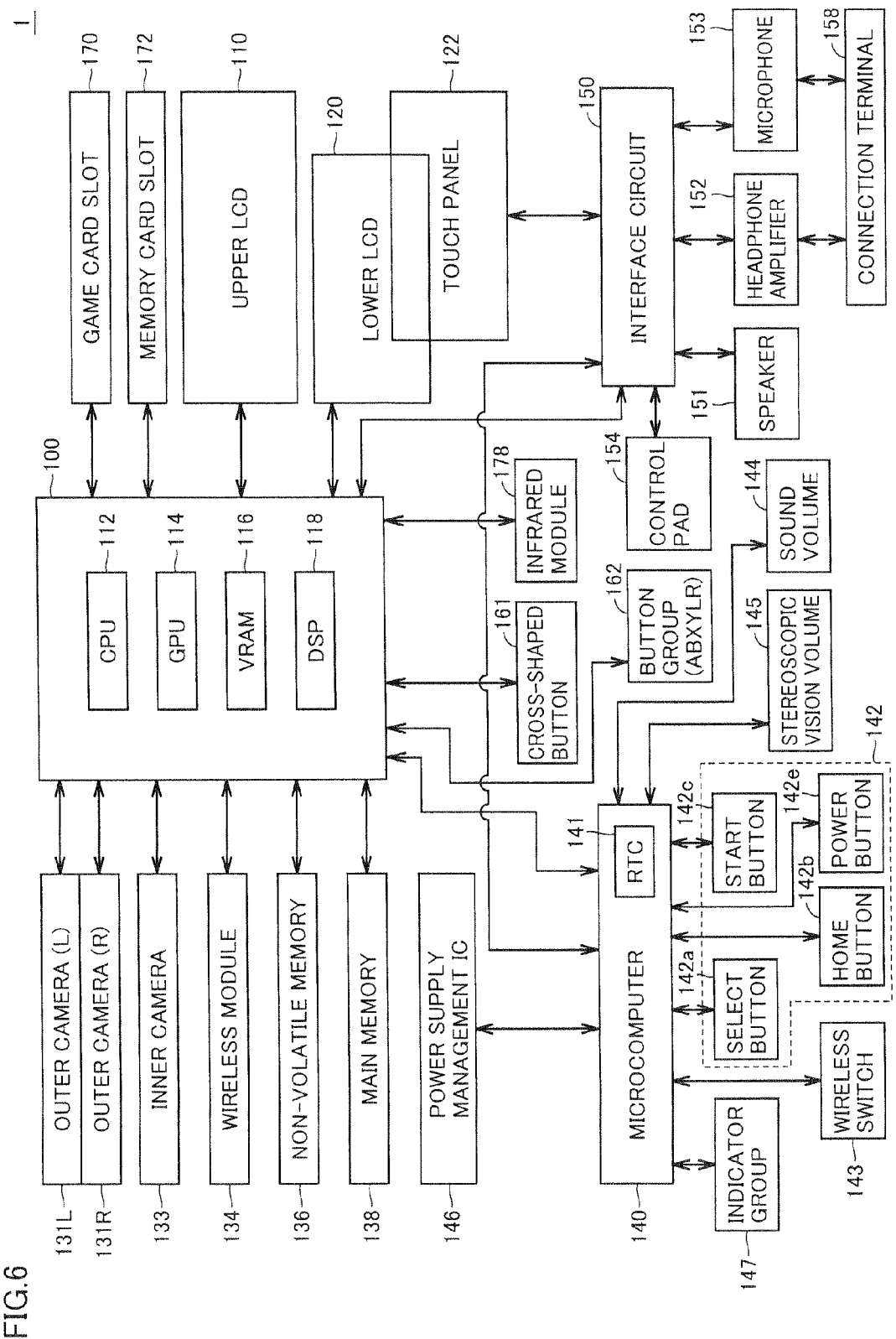
FIG. 6 shows an exemplary non-limiting block diagram showing an electrical configuration of the information processing terminal according to the exemplary embodiment.

Referring to FIG. 6, information processing terminal 1 includes, as electric components, an operation processing unit 100, upper LCD 110, lower LCD 120, touch panel 122, outer cameras 131L, 131R, inner camera 133, a wireless module 134, a non-volatile memory 136, a main memory 138, a microcomputer 140, button group 142, sound volume 144, stereoscopic vision volume 145, a power supply management IC (Integrated Circuit) 146, an indicator group 147, an interface circuit 150, speaker 151, a headphone amplifier 152, a microphone 153, connection terminal 158, cross-shaped button 161, button group 162, game card slot 170, memory card slot 172, and an infrared module 178. In addition, information processing terminal 1 includes a battery and a power supply circuit that are not shown.

Operation processing unit 100 is responsible for overall control of information processing terminal 1. More specifically, operation processing unit 100 realizes processing involved with information processing system 1000 according to the present embodiment by executing firmware (an instruction set) stored in advance in non-volatile memory 136, a program (an instruction set) or data read from game card 171 attached to game card slot 170, a program (an instruction set) or data read from memory card 173 attached to memory card slot 172, or the like.

It is noted that, in addition to a case where a program (an instruction set) executed by operation processing unit 100 is provided through game card 171 or memory card 173, a program may be provided to information processing terminal 1 through an optical recording medium such as a CD-ROM or a DVD. Moreover, a program may be provided from a server apparatus (not shown) connected through a network.

More specifically, operation processing unit 100 includes a CPU (Central Processing Unit) 112, a GPU (Graphical Processing Unit) 114, a VRAM (Video Random Access Memory) 116, and a DSP (Digital Signal Processor) 118.

Each of outer cameras 131L, 131R and inner camera 133 is connected to operation processing unit 100, and outputs an input image obtained as a result of image pick-up to operation processing unit 100 in response to an instruction from operation processing unit 100. Each of these cameras includes image pick-up elements such as CCD (Charge Coupled Device) or a CMOS image sensor and a peripheral circuit for reading image data (input image) obtained by the image pick-up elements.

Wireless module 134 exchanges data with another information processing terminal 1 or some information processing apparatus through a wireless signal.

Non-volatile memory 136 stores firmware or the like necessary for a basic operation of information processing terminal 1 and a code describing the firmware is developed on main memory 138. Main memory 138 is used as a work area or a buffer area for operation processing unit 100 to perform processing. Namely, main memory 138 temporarily stores a program (a code) or data necessary for processing by operation processing unit 100.

Microcomputer 140 mainly provides processing involved with a user interface. More specifically, microcomputer 140 is connected to operation processing unit 100 as well as to button group 142, sound volume 144, stereoscopic vision volume 145, power supply management IC 146, and indicator group 147. Microcomputer 140 senses a user's button operation or the like, outputs the result of sensing to operation processing unit 100, and causes an indicator for notifying the user of various types of information to illuminate, in response to a signal from operation processing unit 100. In addition, microcomputer 140 has a real time counter (RTC: Real Time Clock) 141 providing a time count function.

Indicator group 147 consists of a plurality of LEDs (Light Emitting Diodes) and it is provided in lower housing 103 and upper housing 102. More specifically, indicator group 147 includes a stereoscopic display indicator 147a, a notification indicator 147b, a wireless indicator 147c, a power supply indicator 147d, and a charge indicator 147e. Stereoscopic display indicator 147a is provided on a main surface of upper housing 102 and other indicators are provided on the main surface or on the side surface of lower housing 103.

Power supply management IC 146 causes supply of electric power from a power supply (typically, the battery described above) mounted on information processing terminal 1 to each unit and controls an amount of supply thereof.

Infrared module 178 establishes wireless communication (infrared communication) with another information processing terminal 1. Infrared rays which are carrier waves for infrared communication are projected/received through an infrared port 179 (see FIG. 5B).

Interface circuit 150 is connected to operation processing unit 100 as well as to speaker 151, headphone amplifier 152, microphone 153, control pad 154, and touch panel 122.

Speaker 151 amplifies an audio signal from interface circuit 150 to output voice and sound through sound emission holes 151L and 151R. Headphone amplifier 152 amplifies an audio signal from interface circuit 150 to output voice and sound from a connected headphone. Microphone 153 senses user's voice or the like uttered toward information processing terminal 1 to output an audio signal indicating sensed voice to interface circuit 150. In addition, in response to a detection signal from touch panel 122, interface circuit 150 outputs a signal indicating a position where the user has performed an input operation (a pointing operation) to operation processing unit 100.

Game card slot 170 to which game card 171 is attached and memory card slot 172 to which memory card 173 is attached are each connected to operation processing unit 100.

(d2: Personal Computer 2)

Personal computer 2 according to the present embodiment is a versatile apparatus, and a generally widely used OS (Operating System) is executed on personal computer 2. Namely, personal computer 2 has a versatile architecture.

Figure 7:
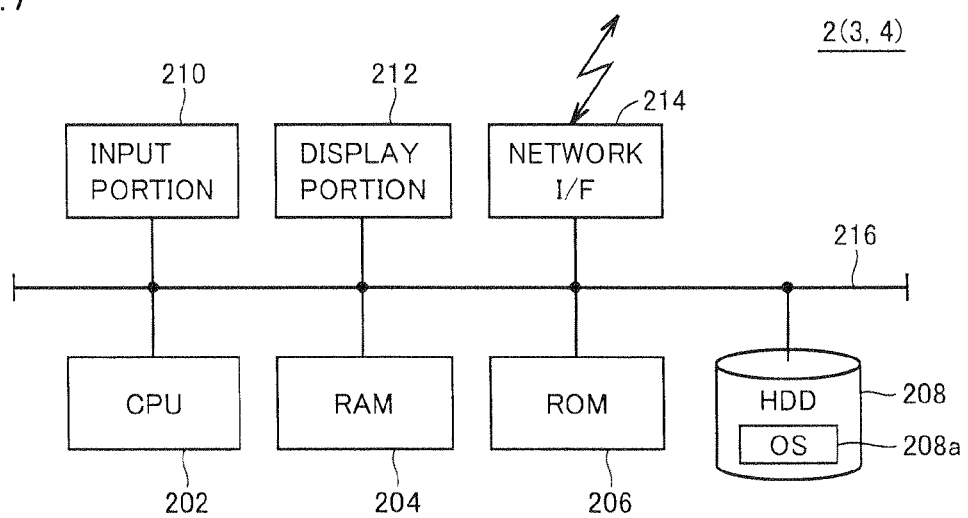
FIG. 7 shows an exemplary non-limiting block diagram showing an electrical configuration of a personal computer according to the exemplary embodiment.

Referring to FIG. 7, personal computer 2 includes a CPU 202, a RAM (Random Access Memory) 204, a ROM (Read Only Memory) 206, an HDD (Hard Disk Drive) 208, an input portion 210, a display portion 212, and a network interface (I/F) 214. Each portion is connected to one another through a bus 216.

CPU 202 is a processing entity for performing various types of processing in personal computer 2, and it performs various functions in accordance with the present embodiment by executing in a prescribed order, programs (a group of instruction codes) stored in advance in ROM 206, HDD 208, or the like. RAM 204 functions as a work area or a buffer area for CPU 202 to execute a program. ROM 206 stores in a non-volatile manner, a BIOS program executed by CPU 202 or various types of setting information. HDD 208 stores a program executed by CPU 202 (for example, OS), downloaded data, and the like.

Input portion 210 is a device for accepting a user's operation, and it typically includes a keyboard, a mouse, a touch panel, and the like. Display portion 212 presents various types of information to the user in accordance with an instruction from CPU 202. Unlike upper LCD 110 of information processing terminal 1 described above, display portion 212 is not adapted to multiple-view display and it is only capable of providing single-view display. Namely, display portion 212 is mounted as a general and versatile LCD.

Network interface 214 is a communication device for establishing wired connection such as Ethernet or wireless connection such as wireless LAN, and it mediates connection between personal computer 2 and server apparatus 5 through network 9.

(d3: PDA 3)

Since PDA 3 according to the present embodiment is similar to personal computer 2 shown in FIG. 7 in electrical configuration, detailed description will not be repeated.

(d4: Portable Telephone 4)

Since portable telephone 4 according to the present embodiment is similar to personal computer 2 shown in FIG. 7 in electrical configuration, detailed description will not be repeated.

(d5: As to Difference Among Information Processing Apparatuses)

As described above, information processing terminal 1 according to the present embodiment is different in type from personal computer 2, PDA 3, and portable telephone 4. Namely, personal computer 2, PDA 3, and portable telephone 4 are apparatuses generally widely used and directed to versatile applications irrespective of manufacturers, whereas information processing terminal 1 is an apparatus directed to a specific application. Therefore, personal computer 2, PDA 3, and portable telephone 4 basically adopt a hardware configuration and a software configuration in accordance with a versatile architecture.

More specifically, information processing terminal 1 is an apparatus having a specific function according to the present embodiment (a function to obtain multiple-view image data by picking up an image of a subject with the use of a plurality of image pick-up portions (cameras) and a function to provide multiple-view display of an image by using the multiple-view image data), whereas personal computer 2, PDA 3, and portable telephone 4 do not have such a specific function. In other words, information processing terminal 1 is designed to appropriately provide multiple-view display of an image by using multiple-view image data, while personal computer 2, PDA 3, and portable telephone 4 are designed for versatile applications.

In addition, information processing terminal 1 performs processing in accordance with a program designed and compiled exclusively for information processing terminal 1, whereas personal computer 2, PDA 3, and portable telephone 4 execute a versatile OS and a versatile application (web browser).

(d6: Server Apparatus 5)

Since server apparatus 5 according to the present embodiment is similar to personal computer 2 shown in FIG. 7 in electrical configuration, detailed description will not be repeated. It is noted that a configuration for realizing various types of processing according to the present embodiment (which will be described later) is mounted on server apparatus 5.

E. User Interface Example and State Transition

An example of a user interface provided by server apparatus 5 according to the present embodiment and state transition will now be described. Though the user interface according to the present embodiment is not limited thereto, a user interface involved with image sharing is provided on each information processing apparatus as a web browser is provided with HTML data (and various types of linked image data and the like).

Figure 9:
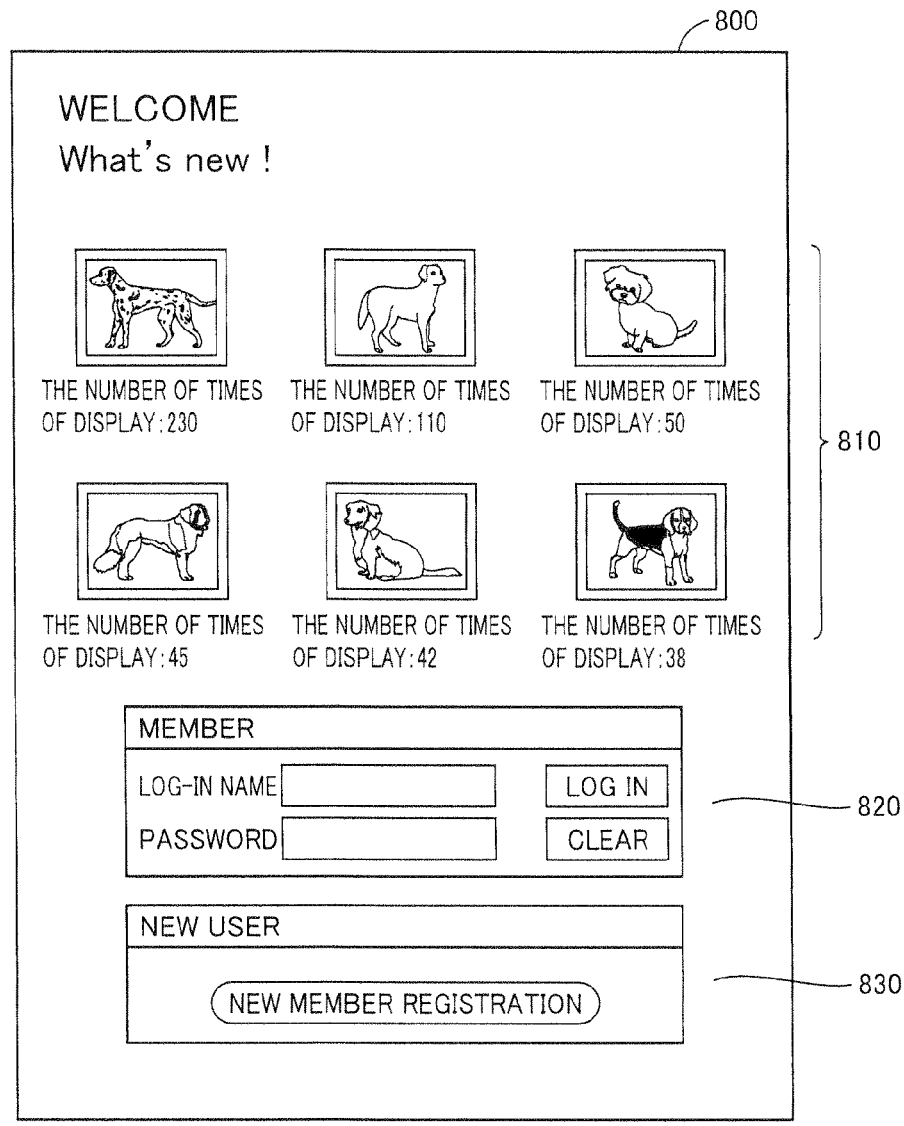
FIGS. 9 to 14 each show an exemplary non-limiting screen of a user interface provided by the server apparatus according to the exemplary embodiment to an information processing apparatus.
Figure 10:
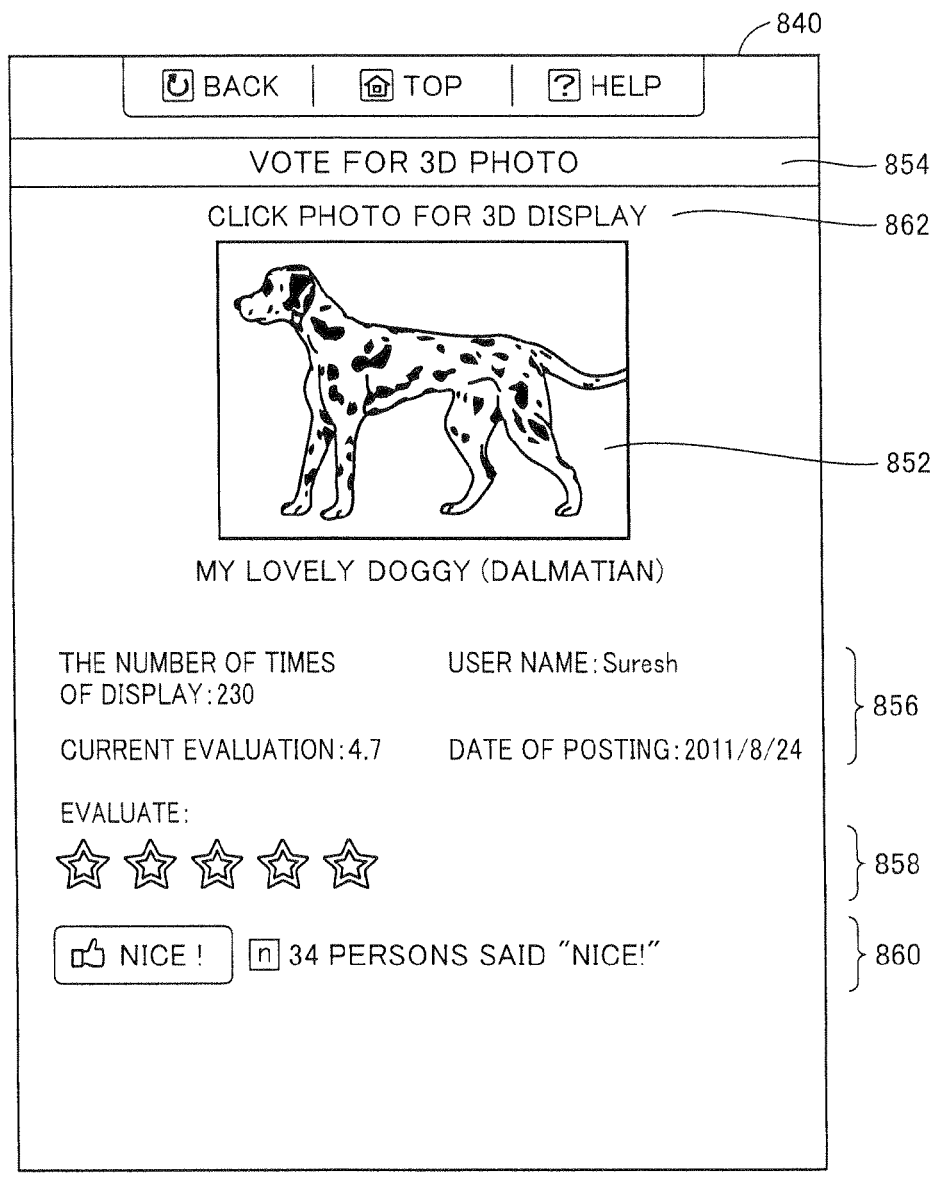
Figure 11:
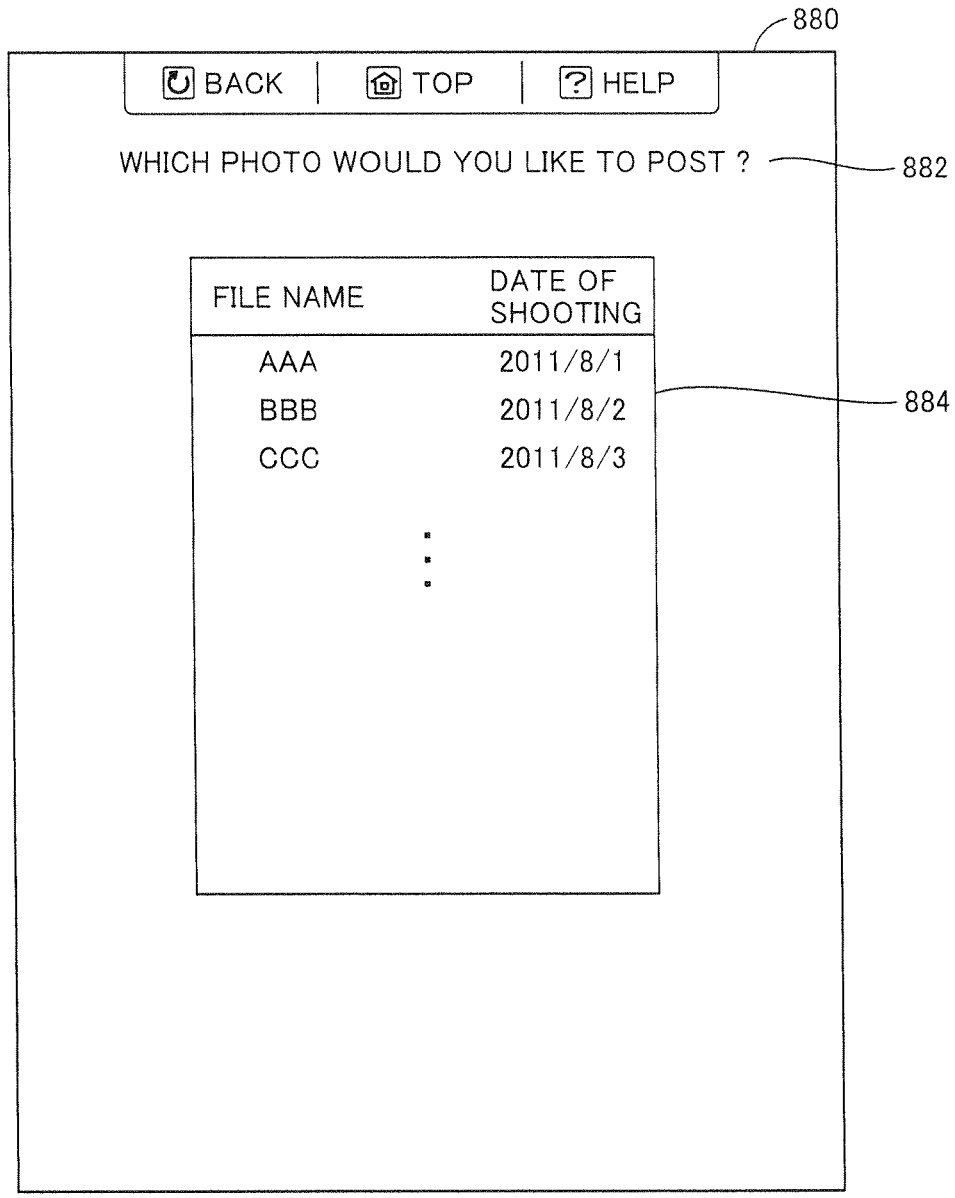

FIGS. 9 to 11 each mainly show an exemplary screen displayed on information processing terminal 1. These user interfaces may be displayed across both of upper LCD 110 and lower LCD 120 of information processing terminal 1, or may be displayed on only one LCD.

Figure 8:
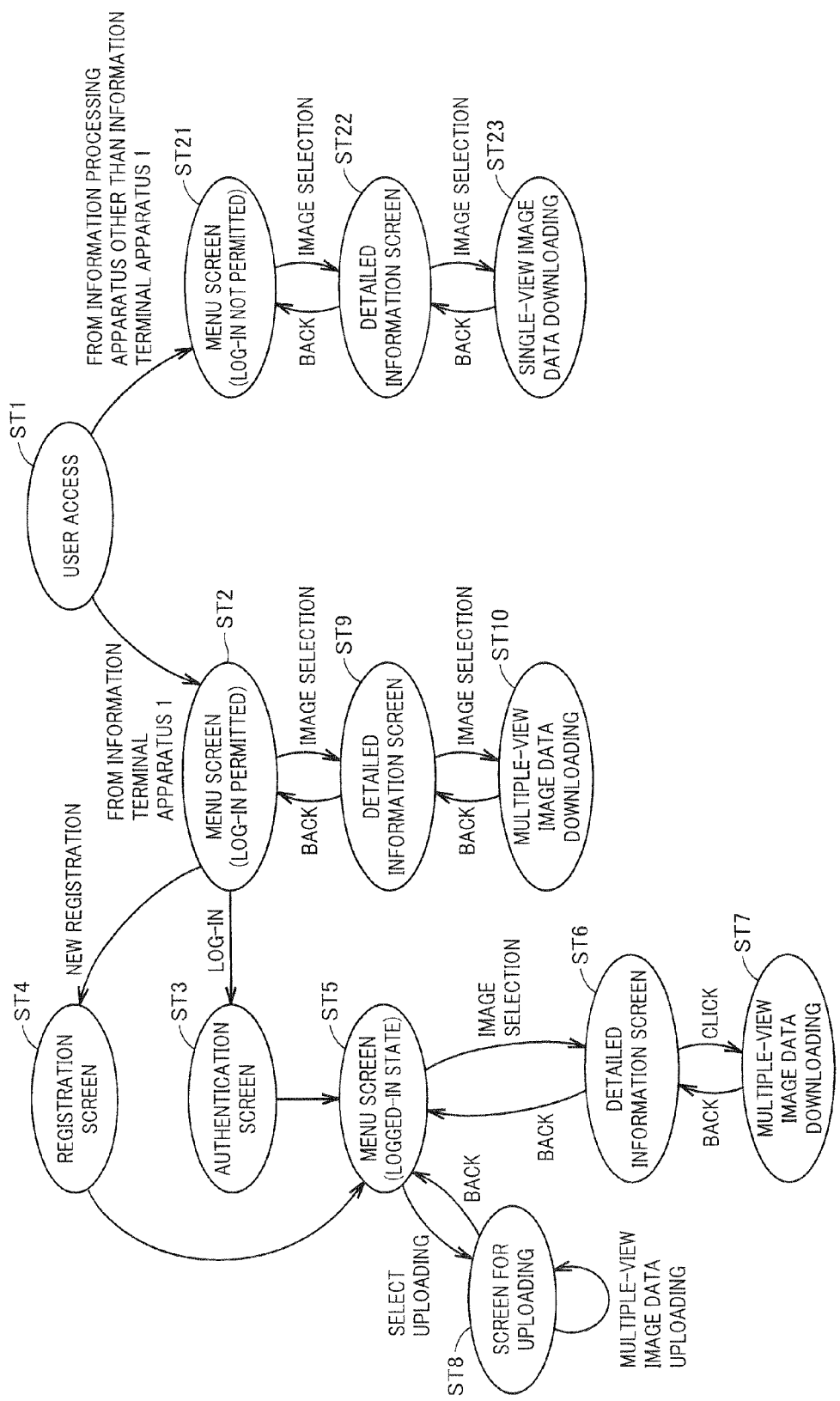
FIG. 8 shows an exemplary non-limiting state transition diagram involved with providing a user interface in a server apparatus according to the exemplary embodiment.

Referring to FIG. 8, when server apparatus 5 receives user access from any information processing apparatus (information processing terminal 1, personal computer 2, PDA 3, or portable telephone 4) in an initial state ST1, it makes transition to any one of a state ST2 directed to information processing terminal 1 and a state ST21 directed an information processing apparatus other than information processing terminal 1 (personal computer 2, PDA 3, or portable telephone 4), depending on a type of the information processing apparatus from which access was made.

The reason why a transition destination is differed as such is mainly as follows. Namely, in response to a request for image transmission (downloading) of multiple-view image data, processing is differed in such a manner that, if the request comes from information processing terminal 1, the requested multiple-view image data is downloaded as it is, and if the request comes from an information processing apparatus other than information processing terminal 1, single-view image data generated from the requested multiple-view image data is downloaded. In addition, an information processing apparatus from which multiple-view image data can be uploaded is restricted to information processing terminal 1, that is, reception by server apparatus 5 of image data from an information processing apparatus other than information processing terminal 1 is restricted.

The type of an information processing apparatus in this initial state ST1 is determined based on identification information associated with the information processing apparatus from which access was made. This identification information includes ID information specifically held by each information processing apparatus and attribute information of a web browser (information on an OS type, information on an OS version, information on a browser type, information on a browser version, and the like).

In state ST2, server apparatus 5 provides a menu screen 800 as shown in FIG. 9 to information processing terminal 1. Referring to FIG. 9, menu screen 800 displays thumbnail images showing several pieces of multiple-view image data among the multiple-view image data already posted (uploaded) to server apparatus 5 (a thumbnail image display region 810). In thumbnail image display region 810, the number of times of display of each piece of multiple-view image data is shown, although without being limited as such.

In information processing system 1000 according to the present embodiment, multiple-view image data cannot be posted (uploaded) unless the user who uses information processing terminal 1 has logged in, although without being limited as such. Therefore, in menu screen 800 provided when access is made from information processing terminal 1 to server apparatus 5, an entry box for the user to log in (a log-in information entry region 820) is displayed. In addition, in menu screen 800, in a case where the user who uses information processing terminal 1 has not completed member registration (authentication information of the user has not been registered), a button for permitting member registration (a member registration button region 830) is displayed.

Thus, in response to access from information processing terminal 1, server apparatus 5 provides a user interface involved with image transmission (uploading) to server apparatus 5 and image obtainment (downloading) from server apparatus 5.

When the user uses information processing terminal 1 to enter his/her authentication information (a log-in name and a password) in log-in information entry region 820 in menu screen 800, authentication processing starts and a not-shown authentication screen is displayed (a state ST3 in FIG. 8).

On the other hand, when a user who has not yet completed member registration uses information processing terminal 1 to select a button in member registration button region 830 in menu screen 800, a not-shown registration screen is displayed (a state ST4 in FIG. 8) and processing for registering the user's authentication information starts. In this registration screen, the user enters such information as any log-in name and password and transmits the information to server apparatus 5. Then, the user's authentication information is registered in server apparatus 5 so that the user can log in server apparatus 5 by using the entered log-in name and password also next time and in subsequent occasions.

When log-in processing is successful or when the user's member registration is completed, the user is in a logged-in state and a menu screen as shown in FIG. 9 is again displayed (a state ST5 in FIG. 8). In the menu screen displayed in this state ST5, an indication that the user has logged in (for example, such indication as "welcome, Mr./Ms. (log-in name)" may be added.

When the user uses information processing terminal 1 to select (click) any thumbnail image in such a menu screen, a detailed information screen for corresponding multiple-view image data is displayed (a state ST6 in FIG. 8). More specifically, in state ST6, server apparatus 5 provides a detailed information screen 840 as shown in FIG. 10 to information processing terminal 1. Referring to FIG. 10, in detailed information screen 840, attribute information on the multiple-view image data corresponding to the selected thumbnail image is displayed. More specifically, an image 852 corresponding to the multiple-view image data is displayed in a size greater than the thumbnail image and corresponding comments and the like are also displayed together. In addition, in detailed information screen 840, attribute information 856 such as the number of times of display, a user name, a current evaluation value, and date of posting is also displayed.

In detailed information screen 840, a message 862 "click photo for 3D display" is displayed around image 852, and when the user uses information processing terminal 1 to click (select) image 852, downloading of the corresponding multiple-view image data starts (a state ST7 in FIG. 8). Namely, the selected multiple-view image data is transmitted from server apparatus 5 to information processing terminal 1, and multiple-view display of the image by using the downloaded multiple-view image data (in this example, stereoscopic display (3D display)) is provided on upper LCD 110 of information processing terminal 1.

The user who viewed the image stereoscopically displayed by using the multiple-view image data as such can enter his/her own evaluation in detailed information screen 840. Namely, the user uses information processing terminal 1 to activate star(s) as many as the number corresponding to his/her own evaluation among five stars displayed in an evaluation field 858. In succession, when the user selects a "vote for 3D photo" button 854, the evaluation value entered in evaluation field 858 is transmitted to server apparatus 5.

In addition, in detailed information screen 840, the user who viewed an image stereoscopically displayed by using the multiple-view image data can also perform an operation for notifying a family member or a friend of the viewed multiple-view image data. By way of example, in detailed information screen 840, an interface 860 for notifying a social network in which each user participates of presence of the corresponding multiple-view image data is displayed. The user operates this interface 860 to notify a family member or a friend of presence of the viewed multiple-view image data. It is noted that the number of users belonging to the same social network who made evaluation (in this example, the number of users who pressed a "nice" button) is also displayed together in this interface 860.

On the other hand, when uploading (posting) of multiple-view image data is selected after the user logged in, a screen for uploading 880 as shown in FIG. 11 is displayed (a state ST8 in FIG. 8). In screen for uploading 880 shown in FIG. 11, together with a message 882 "which photo would you like to post?", a list 884 of multiple-view image data stored in information processing terminal 1 used by the user is displayed. In this list 884, such information as a file name of the multiple-view image data obtained as a result of image pick-up by using a pair of outer cameras 131L and 131R of information processing terminal 1 and a corresponding date of shooting is displayed in a list. The user operates information processing terminal 1 to select multiple-view image data of which uploading is desired. In addition, entry of comments on the selected multiple-view image data and the like may also be allowed. Then, when the user operates information processing terminal 1 to select execution of uploading of the selected multiple-view image data, the multiple-view image data is uploaded from information processing terminal 1 to server apparatus 5. Server apparatus 5 stores the multiple-view image data received from information processing terminal 1 and permits the multiple-view image data to be viewed by another user.

Referring again to FIG. 8, in information processing system 1000 according to the present embodiment, multiple-view image data can be viewed without log-in. Namely, when the user uses information processing terminal 1 to select (click) any thumbnail image in the menu screen (state ST2 in FIG. 8 and FIG. 9) displayed while the user has not logged in, detailed information screen 840 as shown in FIG. 10 is displayed (a state ST9 in FIG. 8). Further, when the user uses information processing terminal 1 to click (select) image 852, downloading of the corresponding multiple-view image data starts (a state ST10 in FIG. 8). Namely, the selected multiple-view image data is transmitted from server apparatus 5 to information processing terminal 1, and upper LCD 110 of information processing terminal 1 provides multiple-view display (in this example, stereoscopic display (3D display)) of an image by using the downloaded multiple-view image data.

It is noted that entry of evaluation by the user may be permitted only when the user has logged in or may be permitted even when the user has not logged in. Such processing is dependent on operation principles of server apparatus 5, and it can arbitrarily be designed. In information processing system 1000 according to the present embodiment, by way of example, it is assumed that evaluation can be entered even when the user has not logged in. Therefore, as described above, the user can transmit his/her evaluation value to server apparatus 5 by using information processing terminal 1 and operating evaluation field 858 and "vote for 3D photo" button 854.

As described above, in information processing system 1000 according to the present embodiment, use of information processing terminal 1 by the user and user log-in have been set as conditions for allowing posting of multiple-view image data. Namely, server apparatus 5 according to the present embodiment has an authentication unit for performing authentication processing based on authentication information (a user name and a password) through information processing terminal 1, and reception only of multiple-view image data from approved information processing terminal 1 is permitted. If only information processing terminal 1 is used, however, multiple-view image data obtained by image pick-up may be uploaded to server apparatus 5.

Figure 12:
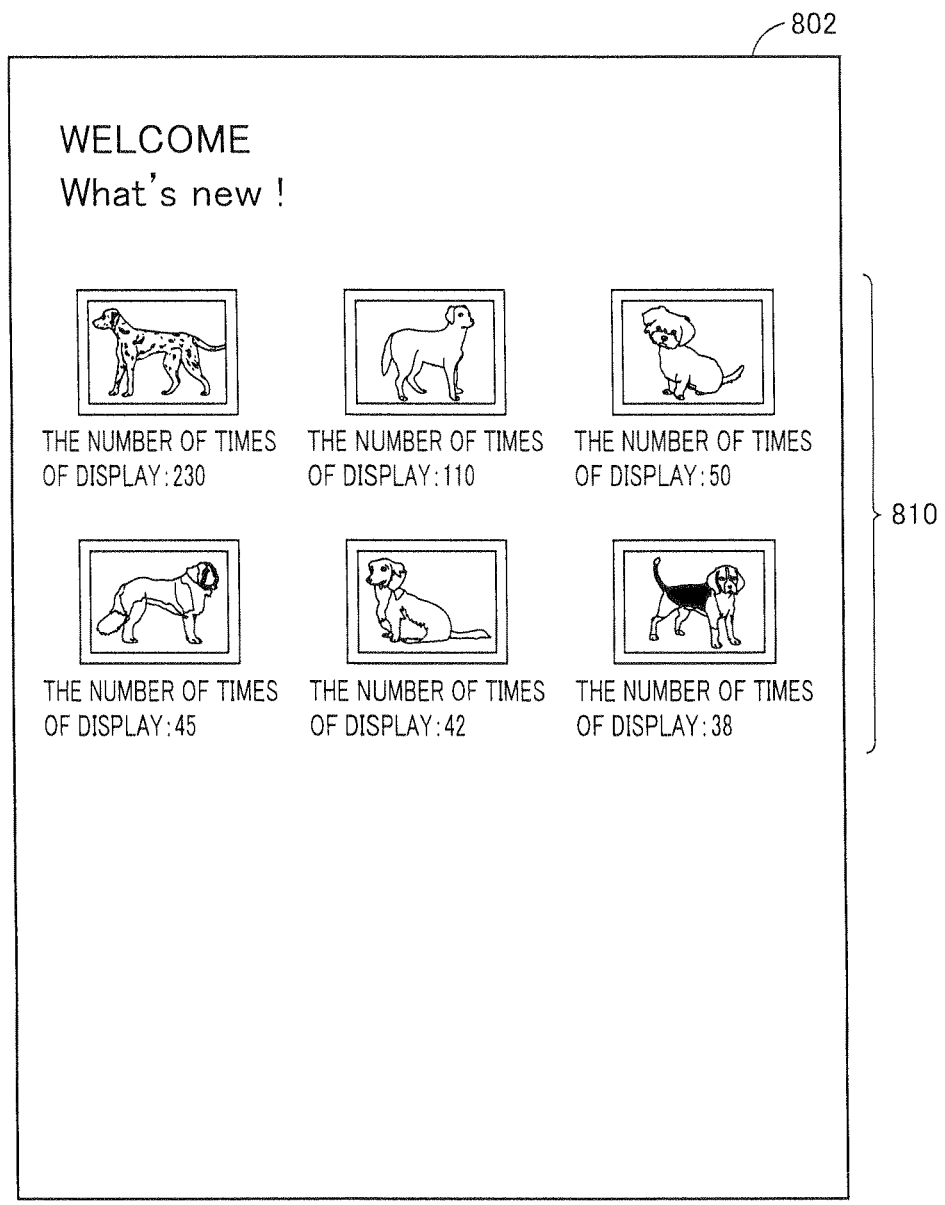

Referring again to FIG. 8, when server apparatus 5 receives user access from an information processing apparatus other than information processing terminal 1, it makes transition to state ST21 and provides a menu screen 802 as shown in FIG. 12 to information processing terminal 1. Referring to FIG. 12, menu screen 802 includes thumbnail image display region 810 as in menu screen 800 shown in FIG. 9 described above. It is noted that menu screen 802 does not include an entry box for the user to log in (log-in information entry region 820) and a button for allowing member registration (member registration button region 830). This is because an information processing apparatus other than information processing terminal 1 essentially cannot obtain multiple-view image data or provide multiple-view display, and hence posting (uploading) of multiple-view image data from such an information processing apparatus is prohibited and the user is potentially invited to use information processing terminal 1.

Thus, in response to access from an information processing apparatus other than information processing terminal 1, server apparatus 5 provides a user interface involved only with image obtainment (downloading) from server apparatus 5. In other words, server apparatus 5 provides a user interface including a log-in screen for performing authentication processing based on authentication information (a log-in name and a password) to information processing terminal 1, whereas it does not provide such a user interface including a log-in screen to an information processing apparatus other than information processing terminal 1. In addition, server apparatus 5 permits the user of information processing terminal 1 to make member registration, while it does not permit an information processing apparatus other than information processing terminal 1 to make member registration.

It is noted that, instead of menu screen 802 as shown in FIG. 12, an entry box shown in FIG. 9 (log-in information entry region 820) and a button for allowing member registration (member registration button region 830) may be displayed as being grayed out.

In information processing system 1000 according to the present embodiment, in order to be able to share posted multiple-view image data among more users, an information processing apparatus other than information processing terminal 1 is also allowed to download an image so long as its function (capability) permits. Namely, server apparatus 5 transmits not selected multiple-view image data itself but single-view image data generated from the multiple-view image data to an information processing apparatus other than information processing terminal 1.

Namely, when the user uses an information processing apparatus other than information processing terminal 1 (personal computer 2, PDA 3, or portable telephone 4) to select (click) any thumbnail image in the menu screen displayed in state ST21 shown in FIG. 8 (see FIG. 9), detailed information screen 840 as shown in FIG. 10 is displayed (a state ST22 in FIG. 8). In addition, when the user uses information processing terminal 1 to click (select) image 852, downloading of single-view image data generated from the corresponding multiple-view image data starts (a state ST23 in FIG. 8). Then, the single-view image data generated from the selected multiple-view image data is transmitted to an information processing apparatus other than information processing terminal 1 (personal computer 2, PDA 3, or portable telephone 4) from server apparatus 5. Then, display portion 212 of the information processing apparatus provides single-view display of an image by using the received single-view image data.

It is noted that a request for image transmission from an information processing apparatus other than information processing terminal 1 may be restricted as compared with information processing terminal 1.

For example, resolution of single-view image data transmitted from server apparatus 5 to an information processing apparatus other than information processing terminal 1 may also be set lower than resolution of the corresponding multiple-view image data. In addition, a message inviting use of information processing terminal 1 may be added to the single-view image data transmitted from server apparatus 5 to an information processing apparatus other than information processing terminal 1. Such a message can be added by using what is called a digital watermark technique or the like.

Further, server apparatus 5 may permit downloading of single-view image data corresponding to the multiple-view image data only when the user who uses information processing terminal 1 has previously entered some kind of evaluation. Namely, only single-view image data corresponding to the multiple-view image data for which user's evaluation has been entered among the multiple-view image data stored in server apparatus 5 can be transmitted to an information processing apparatus other than information processing terminal 1.

Figure 13:
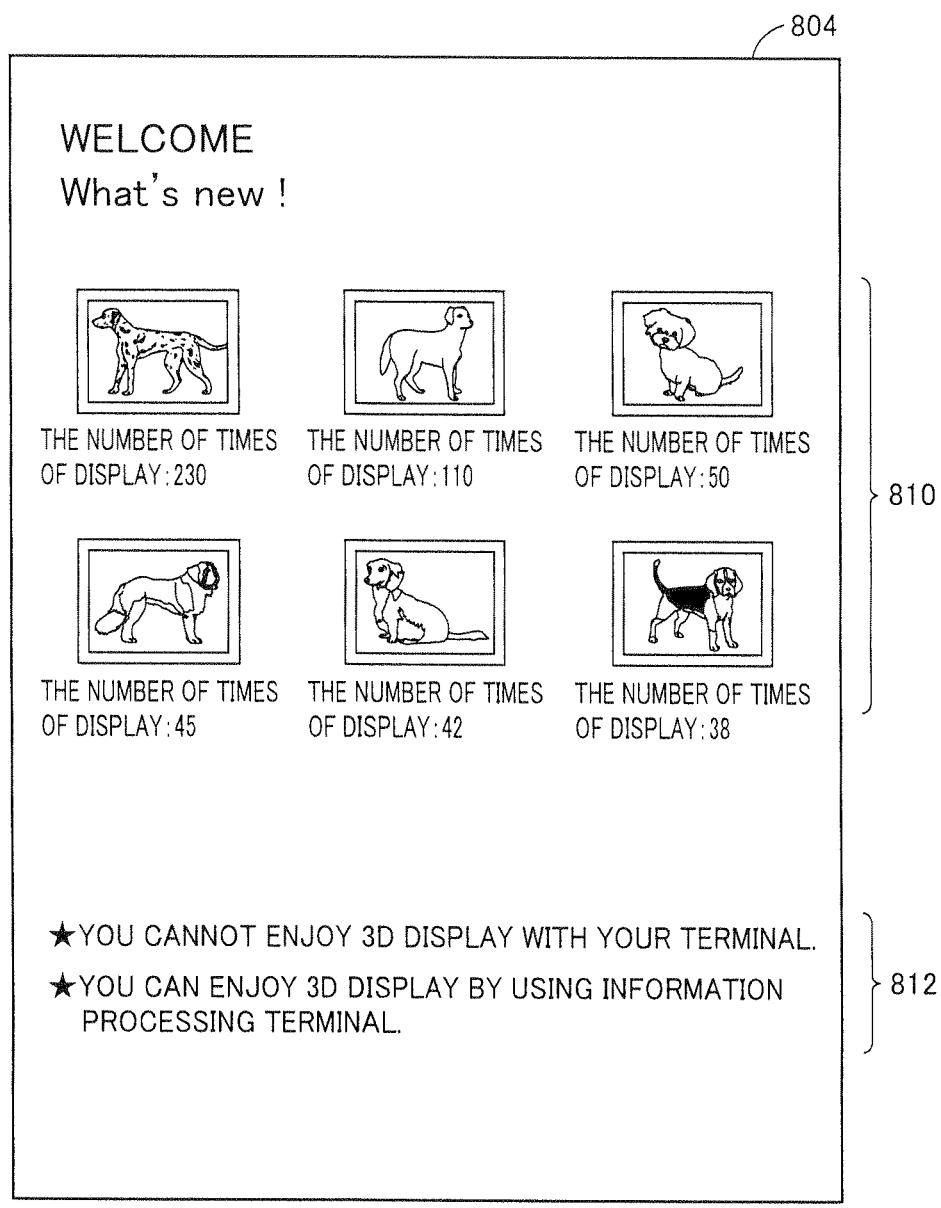

Furthermore, when the user uses an information processing apparatus other than information processing terminal 1 (personal computer 2, PDA 3, or portable telephone 4) to access server apparatus 5, in order to invite the user to use information processing terminal 1, a menu screen 804 as shown in FIG. 13 instead of menu screen 802 as shown in FIG. 12 may be provided by server apparatus 5.

In menu screen 804 shown in FIG. 13, a message 812 notifying the user of the fact that multiple-view display of an image is not provided when access is made by using an information processing apparatus other than information processing terminal 1 (personal computer 2, PDA 3, or portable telephone 4) and that multiple-view display of an image is provided if the user uses information processing terminal 1 to make access is displayed.

Figure 14:
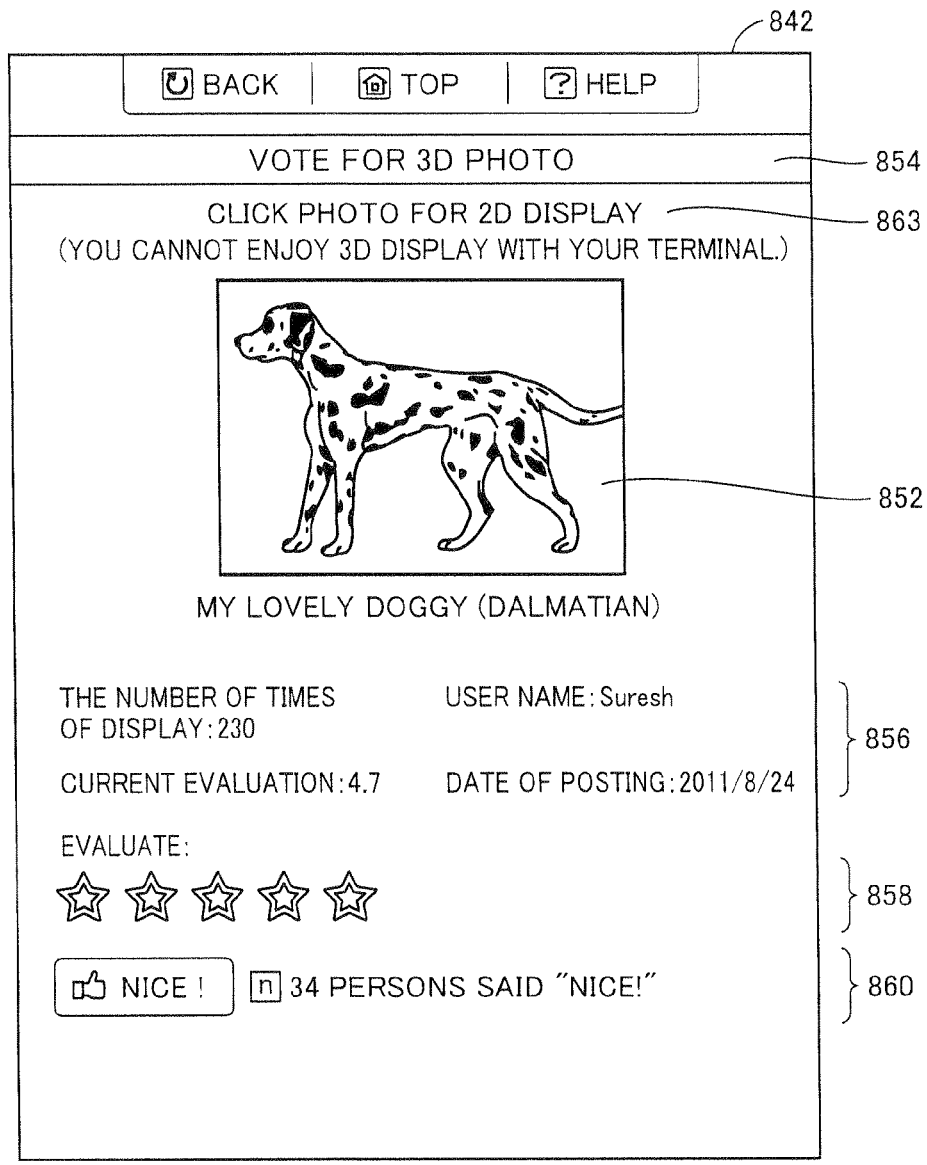

In addition, in menu screen 804 shown in FIG. 13, when the user uses an information processing apparatus other than information processing terminal 1 (personal computer 2, PDA 3, or portable telephone 4) to select (click) any thumbnail image, a detailed information screen 842 for multiple-view image data corresponding to the selected thumbnail image as shown in FIG. 14 is displayed. Unlike detailed information screen 840 (FIG. 10) displayed when the user uses information processing terminal 1 to make access, in detailed information screen 842, a message 863 including a notification that "you cannot enjoy 3D display with your terminal" is displayed around image 852.

By displaying messages 812 and 863 as shown in FIGS. 13 and 14, the user who uses an information processing apparatus other than information processing terminal 1 can potentially be invited to use information processing terminal 1.

In addition, posting (uploading) of multiple-view image data from an apparatus other than information processing terminal 1, which is capable of obtaining multiple-view image data (such as a digital camera equipped with a stereo camera), may also be prohibited. Namely, in order to provide stereoscopic display on upper LCD 110 of information processing terminal 1, resolution, a format or the like of multiple-view image data used is regulated, and in order to follow such regulations, a source of generation of multiple-view image data to be uploaded is preferably restricted. Then, only uploading from information processing terminal 1 capable of generating specific multiple-view image data may be permitted and uploading of multiple-view image data obtained by an apparatus other than that may be prohibited.

F. Functional Configuration

A functional configuration for implementing information processing system 1000 according to the present embodiment will now be described.

Figure 15:
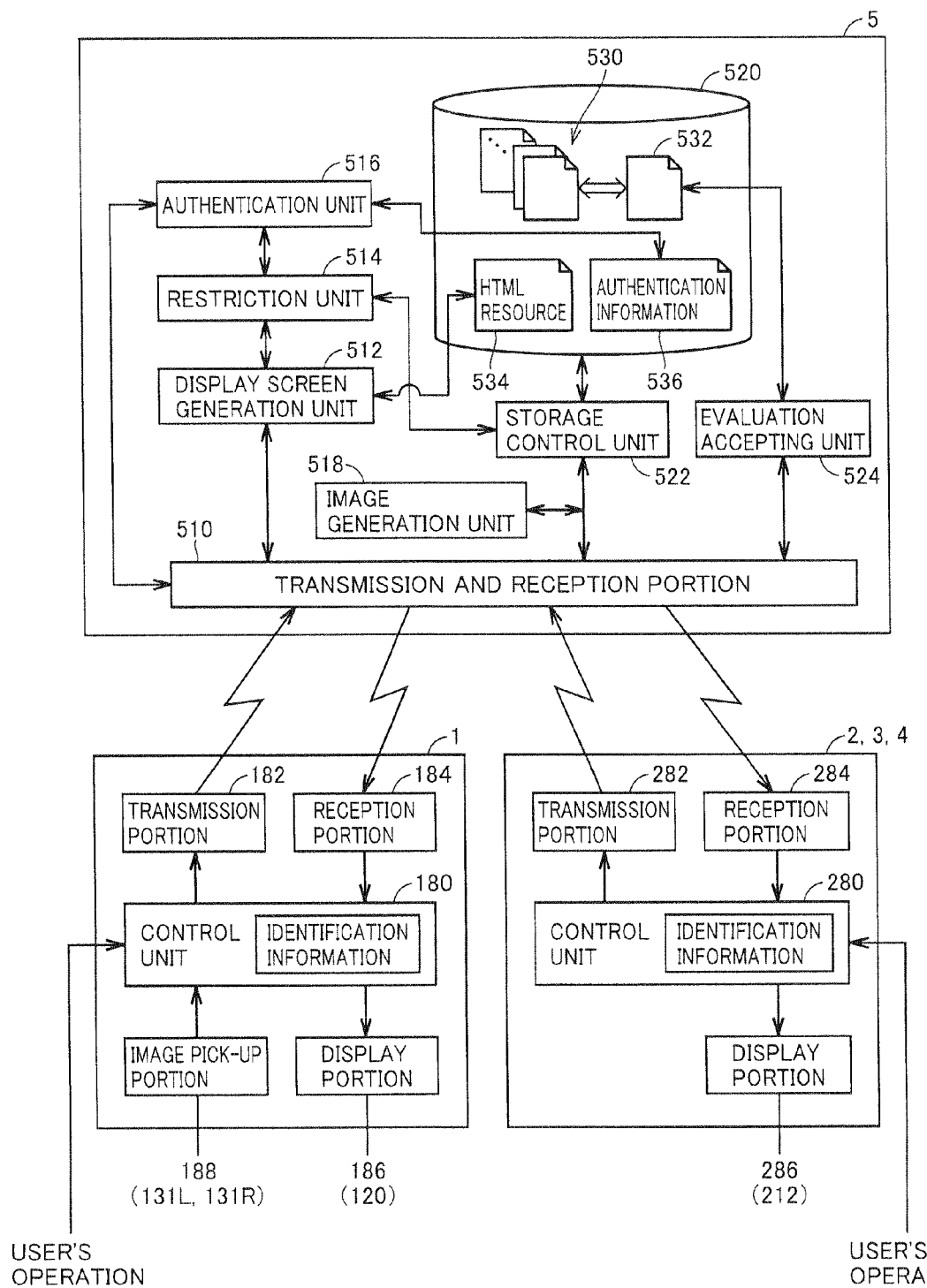
FIG. 15 shows an exemplary non-limiting schematic diagram showing a functional configuration for implementing the information processing system according to the exemplary embodiment.

Referring to FIG. 15, information processing system 1000 includes server apparatus 5, at least one information processing terminal 1 capable of communicating with server apparatus 5, and at least one personal computer 2 (or PDA 3 or portable telephone 4) capable of communicating with server apparatus 5. Though FIG. 15 shows only one information processing terminal 1 and only one personal computer 2 for the sake of convenience of illustration, the example is not limited as such.

(f1: Information Processing Terminal 1)

Information processing terminal 1 includes, as its functional configuration, a control unit 180, a transmission portion 182, a reception portion 184, a display portion 186, and an image pick-up portion 188. These functions are typically implemented by execution of a program by CPU 112 in operation processing unit 100 of information processing terminal 1.

Transmission portion 182 provides a function to obtain multiple-view image data and transmit the multiple-view image data to server apparatus 5. In addition, transmission portion 182 provides a function to transmit a request for access including a request for image transmission to server apparatus 5 in response to a user's operation.

Reception portion 184 provides a function to download multiple-view image data from server apparatus 5 and receive data (typically, HTML data) implementing a user interface (screen) for accessing server apparatus 5.

Display portion 186 provides a function to provide multiple-view display of an image by using the multiple-view image data from server apparatus 5. Display portion 186 is implemented in coordination with upper LCD 110 (see FIG. 3).

Image pick-up portion 188 provides a function for obtaining multiple-view image data. This image pick-up portion 188 is implemented in coordination with outer cameras 131L and 131R (see FIG. 4A). The multiple-view image data obtained by this image pick-up portion 188 is transmitted to server apparatus 5 by transmission portion 182.

Control unit 180 provides a function to control each portion described above. In addition, control unit 180 causes transmission portion 182 to transmit identification information involved with information processing terminal 1 to server apparatus 5 in response to a request from server apparatus 5.

(f2: Personal Computer 2)

Personal computer 2 includes, as its functional configuration, a control unit 280, a transmission portion 282, a reception portion 284, and a display portion 286. These functions are typically implemented by execution of a program by CPU 202 in personal computer 2.

Transmission portion 282 provides a function to transmit a request for access including a request for image transmission to server apparatus 5, in response to a user's operation.

Reception portion 284 provides a function to download single-view image data from server apparatus 5 and receive data (typically, HTML data) implementing a user interface (screen) for accessing server apparatus 5.

Display portion 286 provides a function to provide single-view display of an image by using the single-view image data from server apparatus 5. Display portion 286 is implemented in coordination with display portion 212 (see FIG. 7).

Control unit 280 provides a function to control each portion described above. In addition, control unit 280 causes transmission portion 282 to transmit identification information involved with personal computer 2 to server apparatus 5 in response to a request from server apparatus 5.

(f3: Server Apparatus 5)

Server apparatus 5 includes, as its functional configuration, a transmission and reception portion 510, a display screen generation unit 512, a restriction unit 514, an authentication unit 516, an image generation unit 518, a storage portion 520, a storage control unit 522, and an evaluation accepting unit 524. Storage portion 520 mainly stores multiple-view image data 530 received from information processing terminal 1, attribute information 532 associated with multiple-view image data 530, an HTML source 534, and authentication information 536. Among these functions, storage portion 520 is implemented by making use of a part of an HDD of server apparatus 5 and other functions are implemented by execution of a program by the CPU of server apparatus 5.

Transmission and reception portion 510 provides a function to exchange data with information processing terminal 1, personal computer 2, PDA 3, portable telephone 4, and the like. Specifically, transmission and reception portion 510 transmits, in response to a request for image transmission from information processing terminal 1, multiple-view image data stored in storage portion 520 to information processing terminal 1 from which the request was made, and transmits, in response to a request for image transmission from personal computer 2, PDA 3, or portable telephone 4 other than information processing terminal 1, single-view image data generated from the multiple-view image data stored in storage portion 520 to personal computer 2 or the like from which the request was made.

Display screen generation unit 512 provides a function to generate data for displaying a user interface screen for sharing an image, in response to access from information processing terminal 1, personal computer 2, PDA 3, or portable telephone 4. More specifically, display screen generation unit 512 generates HTML data adapted to an apparatus from which the request was made, by referring to HTML source 534 stored in storage portion 520. Display screen generation unit 512 restricts uploading of multiple-view image data to uploading only from information processing terminal 1 in response to a command from restriction unit 514, and therefore contents in the HTML data (a web page) may be different. Display screen generation unit 512 may dynamically generate HTML data from HTML source 534 with CGI (Common Gateway Interface) or the like, or may statically output HTML data from the HTML data included in HTML source 534 in advance.

Restriction unit 514 provides a function for permitting reception of multiple-view image data from information processing terminal 1, while restricting reception of at least multiple-view image data from personal computer 2, PDA 3, or portable telephone 4. More specifically, restriction unit 514 determines, in response to access from information processing terminal 1 and any of personal computer 2, PDA 3, and portable telephone 4, whether or not to restrict reception of at least multiple-view image data from the information processing apparatus from which access was made, based on identification information associated with the information processing apparatus from which access was made. Examples of identification information associated with an information processing apparatus from which access was made include identification information of each information processing apparatus held by control units 180 and 280, meta information on a web browser executed on each information processing apparatus (including information on an OS type, information on an OS version, information on a browser type, information on a browser version, and the like), and the like.

Namely, restriction unit 514 determines, in response to access from information processing terminal 1 and any of personal computer 2, PDA 3, and portable telephone 4, whether or not to restrict reception of at least multiple-view image data from the information processing apparatus from which access was made, based on identification information of a web browser of the information processing apparatus which made access. Then, only when it could be specified that the information processing apparatus from which access was made is information processing terminal 1, restriction unit 514 permits reception of the multiple-view image data.

In addition, restriction unit 514 may not provide a user interface for uploading multiple-view image data to an information processing apparatus other than information processing terminal 1. For example, restriction unit 514 may allow transmission, in response to access from information processing terminal 1, of data (HTML data) for displaying a screen (web page) involved with image transmission to server apparatus 5 and image obtainment from server apparatus 5 by means of information processing terminal 1 to information processing terminal 1, while it may allow transmission, in response to access from any of personal computer 2, PDA 3, and portable telephone 4, of data (HTML data) for displaying a screen (web page) involved with image obtainment from server apparatus 5 by means of any of these apparatuses to these information processing apparatuses. In other words, a user interface allowing only downloading of an image from server apparatus 5 when access from any of personal computer 2, PDA 3, and portable telephone 4 is made is provided.

Alternatively, in coordination with authentication unit 516, restriction unit 514 may permit reception of multiple-view image data only when authentication processing based on authentication information through information processing terminal 1 is successful.

Namely, authentication unit 516 performs authentication processing based on authentication information through information processing terminal 1. Specifically, when the user enters such authentication information as identification information (ID) and a password of the user himself/herself by operating information processing terminal 1, authentication unit 516 performs authentication processing of the entered authentication information by referring to authentication information 536 stored in storage portion 520. When this authentication processing is successful, authentication unit 516 notifies restriction unit 514 of that fact. Then, restriction unit 514 permits reception only of multiple-view image data from information processing terminal 1 approved by authentication unit 516. Namely, unless authentication unit 516 approves, uploading of multiple-view image data from information processing terminal 1 is not permitted.

Alternatively, such a user interface for authentication may be provided only to information processing terminal 1, and such a user interface may not be provided to personal computer 2, PDA 3, and portable telephone 4.

It is noted that authentication information 536 stored in storage portion 520 may be generated based on information registered in advance by each user. Namely, in order to upload multiple-view image data to server apparatus 5, each user may be requested to register his/her authentication information in advance. In a case where such a system requiring registration in advance is adopted, an information processing apparatus providing a user interface for registration in advance may be limited. Namely, restriction unit 514 may permit information processing terminal 1 to register authentication information, and may not permit personal computer 2, PDA 3, and portable telephone 4 to register authentication information. By adopting such processing, the user cannot register his/her authentication information without using information processing terminal 1.

In addition, data (HTML data) for displaying a log-in screen (web page) for performing authentication processing based on authentication information may be transmitted to information processing terminal 1, while data for displaying such a log-in screen may not be transmitted to personal computer 2, PDA 3, or portable telephone 4. In other words, a log-in screen interface may be provided only when access from information processing terminal 1 is made.

Image generation unit 518 provides a function to generate a single-view image from the requested multiple-view image. Various methods can be adopted for processing for generating such a single-view image.

Figure 16:
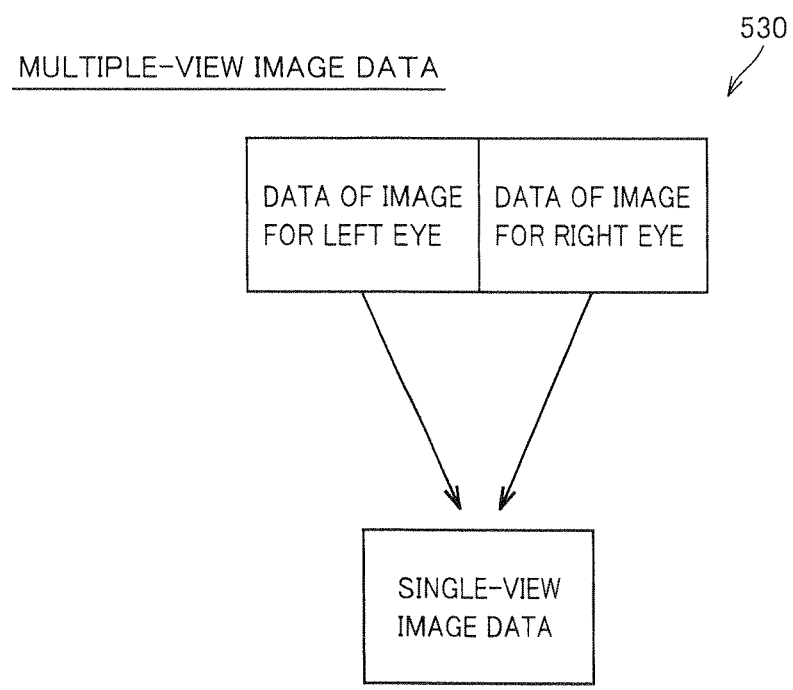
FIG. 16 shows an exemplary non-limiting schematic diagram showing a method of generating single-view image data according to the exemplary embodiment.
Figure 17B:
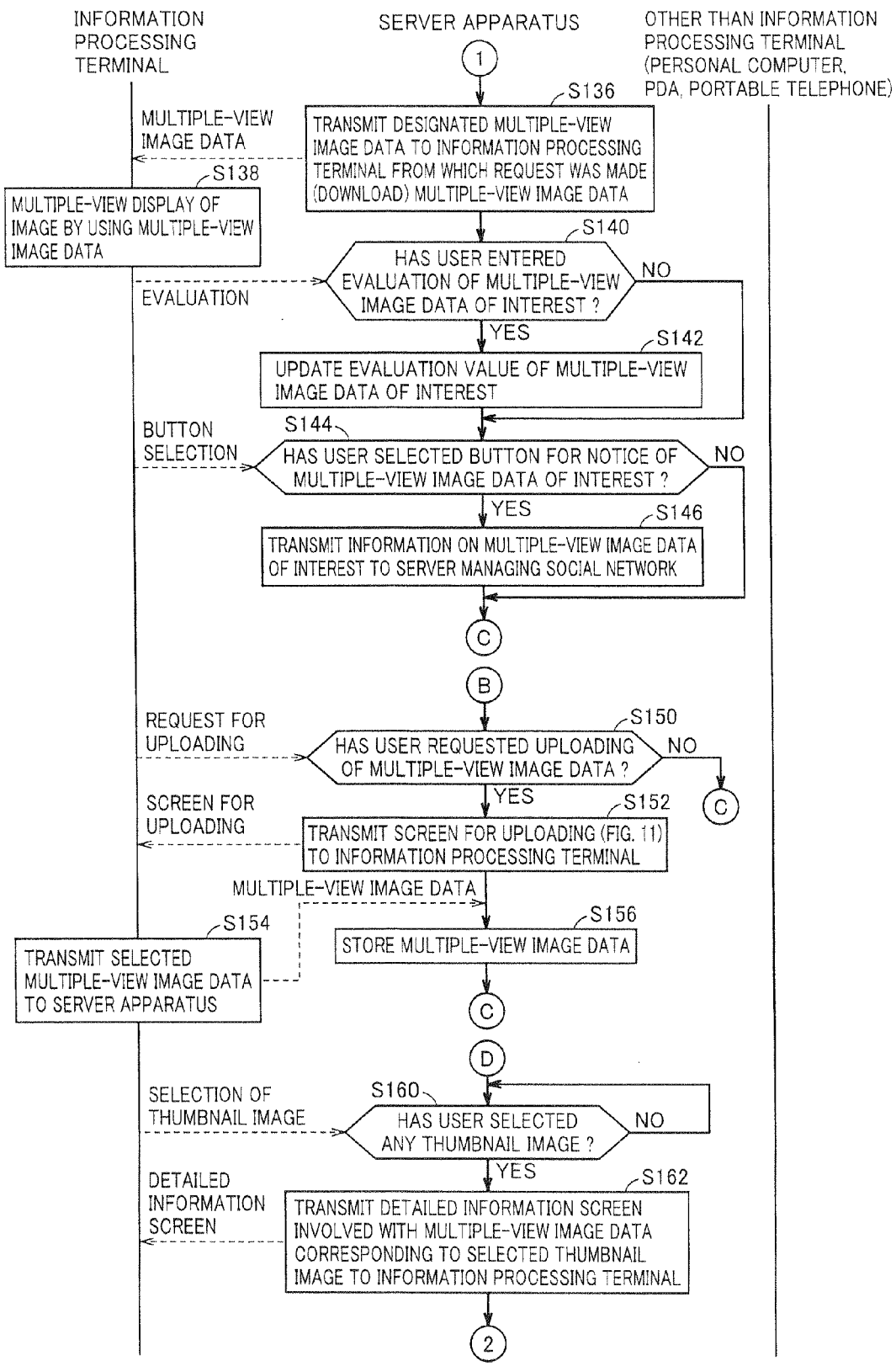

Referring to FIG. 16, in a case where stereo image data is adopted as multiple-view image data, data of an image for right eye and data of an image for left eye are paired. The simplest method of generating single-view image data is a method of outputting one of data of an image for right eye and data of an image for left eye constituting the multiple-view image data as single-view image data as it is. According to this method, if only the data of the image for right eye and the data of the image for left eye can be separated from each other, single-view image data can more readily be generated.

Alternatively, since prescribed parallax is present between the data of the image for right eye and the data of the image for left eye, single-view image data may be generated by specifying a corresponding region between the data of the image for right eye and the data of the image for left eye and performing interpolation processing from image data based on correspondence between these images. According to this method, an image having contents closer to an image displayed by using the multiple-view image data can be displayed.

In addition, the timing to generate a single-view image from a multiple-view image may be designed as appropriate. Namely, image generation unit 518 may generate corresponding single-view image data from the requested multiple-view image data when request for image transmission from an information processing apparatus other than information processing terminal 1 (personal computer 2, PDA 3, or portable telephone 4) is received. In other words, each time image transmission is requested, single-view image data may be generated. Here, the generated single-view image data may be erased after it is transmitted to an information processing apparatus from which the request was made, or it may be saved for a prescribed period of time. In the latter example, when transmission of the same multiple-view image data is again requested, the saved single-view image data may be transmitted to an information processing apparatus other than information processing terminal 1 (personal computer 2, PDA 3, or portable telephone 4). It is an effective method in a case where processing for generating single-view image data from multiple-view image data is light in view of the capability of server apparatus 5.

On the other hand, in a case where processing for generating single-view image data from multiple-view image data is heavy in view of the capability of server apparatus 5, single-view image data may be generated in advance. Namely, when multiple-view image data is received from information processing terminal 1, image generation unit 518 generates single-view image data corresponding to the multiple-view image data. Then, storage portion 520 stores the multiple-view image data and the corresponding single-view image data in association with each other. In addition, transmission and reception portion 510 transmits, in response to a request for image transmission from an information processing apparatus other than information processing terminal 1 (personal computer 2, PDA 3, or portable telephone 4), single-view image data stored in association with the multiple-view image data to the information processing apparatus from which the request was made. Thus, by generating single-view image data each time multiple-view image data is posted from information processing terminal 1, response to a request for image transmission from an information processing apparatus other than information processing terminal 1 (personal computer 2, PDA 3, or portable telephone 4) can more quickly be made.

It is noted that, when image generation unit 518 generates single-view image data from the multiple-view image data, it may generate single-view image data lower in resolution than original multiple-view image data. Namely, resolution of single-view image data may be set lower than that of the corresponding multiple-view image data.

Storage control unit 522 causes storage portion 520 to store multiple-view image data 530 received from information processing terminal 1. When multiple-view image data 530 is added or updated, storage control unit 522 updates contents in attribute information 532. In attribute information 532, attribute information on each piece of multiple-view image data 530 stored in storage portion 520 is described. This attribute information includes such information as a name of a user who posted (transmitted) multiple-view image data 530, time and date of posting, evaluation, and comments and review from a user who viewed the data.

When a request for image transmission is made from any information processing apparatus, storage control unit 522 outputs the designated multiple-view image data (or corresponding single-view image data) among multiple-view image data 530 stored in storage portion 520.

Evaluation accepting unit 524 accepts a result of evaluation of an image shown by multiple-view image data 530 stored in storage portion 520. Namely, when the user's evaluation of the multiple-view image data (or the corresponding single-view image data) transmitted in response to the request for image transmission is entered (that is, the user's evaluation is received from any information processing apparatus), evaluation accepting unit 524 updates an entry corresponding to multiple-view image data 530 of interest in attribute information 532 based on the entered evaluation.

In a case where such a configuration for accepting evaluation is adopted, storage control unit 522 may allow transmission of only multiple-view image data corresponding to the multiple-view image data of which evaluation has been entered through evaluation accepting unit 524 among the multiple-view image data stored in storage portion 520 to an information processing apparatus other than information processing terminal 1 (personal computer 2, PDA 3, or portable telephone 4). Namely, only multiple-view image data that the user possessing information processing terminal 1 clearly viewed may be viewable also on an information processing apparatus other than information processing terminal 1.

G. Processing Procedure

A processing procedure performed in information processing system 1000 according to the present embodiment will now be described.

FIGS. 17A to 17D are flowcharts each showing a processing procedure performed in information processing system 1000. Processing performed by each of information processing terminal 1, an information processing apparatus other than information processing terminal 1, and server apparatus 5 shown in FIGS. 17A to 17D is typically implemented by execution of a program by each processing entity (typically, a CPU). It is noted that each apparatus does not have to execute a single program but one application or a plurality of applications may be executed together with a program (or firmware) providing a basic OS. In addition, the entirety or a part of processing performed by each apparatus may be performed by dedicated hardware.

Referring to FIGS. 17A to 17D, server apparatus 5 determines whether it has received user access from any information processing apparatus or not (step S100). When it has not received user access from any information processing apparatus (NO in step S100), the processing in step S100 is repeated.

When server apparatus 5 has received user access from any information processing apparatus (YES in step S100), server apparatus 5 determines a type of the information processing apparatus from which access was made (step S102). When access was made from information processing terminal 1 ("information processing terminal" in step S102), the process proceeds to step S110, and when access was made from an information processing apparatus other than information processing terminal 1 (personal computer 2, PDA 3, or portable telephone 4) ("other than information processing terminal" in step S102), the process proceeds to step S178.

In step S110, server apparatus 5 transmits menu screen 800 as shown in FIG. 9 to information processing terminal 1 (step S110). Namely, server apparatus 5 transmits data (typically, HTML data) for displaying menu screen 800 involved with image transmission to server apparatus 5 and image obtainment from server apparatus 5 to information processing terminal 1.

In succession, server apparatus 5 determines whether or not the user has used information processing terminal 1 to enter his/her authentication information (a log-in name and a password) in log-in information entry region 820 in menu screen 800 and transmit the authentication information (step S112). When the user has entered and transmitted his/her authentication information (YES in step S112), server apparatus 5 performs authentication processing based on the authentication information entered through information processing terminal 1 (step S114). Further, server apparatus 5 determines whether authentication processing in step S114 has been successful or not (step S116). When the authentication processing in step S114 has been unsuccessful (NO in step S116), the process returns to step S112.

In contrast, when the authentication processing in step S114 has been successful (YES in step S116), the log-in state is established and the process proceeds to step S130.

When the user has not entered and transmitted his/her authentication information (NO in step S112), server apparatus 5 determines whether or not the user has used information processing terminal 1 to select member registration in member registration button region 830 (step S118). When the user has selected member registration (YES in step S118), server apparatus 5 performs processing for registering entered user's authentication information (step S120). Then, the user is in the log-in state and the process proceeds to step S130.

In step S130, server apparatus 5 determines whether or not the user has used information processing terminal 1 to select any thumbnail image in menu screen 800 (step S130).

When the user has selected any thumbnail image (YES in step S130), server apparatus 5 transmits detailed information screen 840 involved with the multiple-view image data corresponding to the selected thumbnail image to information processing terminal 1 (step S132). In succession, server apparatus 5 determines whether or not the user has used information processing terminal 1 to request image transmission (downloading) of the multiple-view image data displayed in detailed information screen 840 (step S134). When the user has not requested downloading of the multiple-view image data (NO in step S134), the processing in step S134 is repeated.

When the user has requested downloading of the multiple-view image data (YES in step S134), server apparatus 5 transmits (downloads), in response to the request for image transmission (downloading) from information processing terminal 1, the designated multiple-view image data to information processing terminal 1 from which the request was made (step S136). Then, information processing terminal 1 provides multiple-view display of an image by using the multiple-view image data from server apparatus 5 (step S138).

In succession, server apparatus 5 determines whether or not the user has used information processing terminal 1 to enter evaluation of the multiple-view image data of interest in detailed information screen 840 (step S140). When the user has entered evaluation of the multiple-view image data (YES in step S140), server apparatus 5 updates an evaluation value (value of attribute information 532) of the multiple-view image data of interest based on the entered user's evaluation value (step S142).

When the user has not entered evaluation of the multiple-view image data (NO in step S140) or after step S142 is performed, whether or not the user has used information processing terminal 1 to select a button for notifying a family member or a friend of the multiple-view image data of interest is determined (step S144). When the user has selected a button for notifying a family member or a friend of the multiple-view image data of interest (YES in step S144), server apparatus 5 transmits information on the multiple-view image data of interest to a server managing a social network (step S146).

When the user has not selected a button for notifying a family member or a friend of the multiple-view image data of interest (NO in step S144) or after step S146 is performed, the process returns to step S130.

In contrast, when the user has selected no thumbnail image (NO in step S130), server apparatus 5 determines whether or not the user has used information processing terminal 1 to request uploading of the multiple-view image data in menu screen 800 (step S150). When the user has not requested uploading of the multiple-view image data (NO in step S150), the process returns to step S130.

When the user has requested uploading of the multiple-view image data (YES in step S150), server apparatus 5 transmits screen for uploading 880 as shown in FIG. 11 to information processing terminal 1 (step S152). In succession, when the user has used information processing terminal 1 to select the multiple-view image data to be uploaded in screen for uploading 880, information processing terminal 1 transmits the selected multiple-view image data to server apparatus 5 (step S154). Server apparatus stores the multiple-view image data received from information processing terminal 1 (step S156). Here, server apparatus 5 also stores attribute information on the multiple-view image data received from information processing terminal 1. Then, the process returns to step S130.

In contrast, when the user has not selected member registration (NO in step S118), such a state that the user has not logged in is maintained. Then, server apparatus 5 determines whether or not the user has used information processing terminal 1 to select any thumbnail image in menu screen 800 (step S160).

When the user has selected any thumbnail image (YES in step S160), server apparatus 5 transmits detailed information screen 840 as shown in FIG. 10, which is involved with the multiple-view image data corresponding to the selected thumbnail image, to information processing terminal 1 (step S162).

When the user has selected no thumbnail image (NO in step S160) or after step S162 is performed, server apparatus 5 determines whether or not the user has used information processing terminal 1 to request image transmission (downloading) of the multiple-view image data displayed in detailed information screen 840 (step S164). When the user has not requested downloading of the multiple-view image data (NO in step S164), the processing in step S164 is repeated.

When the user has requested downloading of the multiple-view image data (YES in step S164), server apparatus 5 transmits (downloads), in response to the request for image transmission (downloading) from information processing terminal 1, the designated multiple-view image data to information processing terminal 1 from which the request was made (step S166). Then, information processing terminal 1 provides multiple-view display of an image by using the multiple-view image data from server apparatus 5 (step S168).

In succession, server apparatus 5 determines whether or not the user has used information processing terminal 1 to enter evaluation of the multiple-view image data of interest in detailed information screen 840 (step S170). When the user has entered evaluation of the multiple-view image data (YES in step S170), server apparatus 5 updates an evaluation value (value of attribute information 532) of the multiple-view image data of interest based on the entered user's evaluation value (step S172).

When the user has not entered evaluation of the multiple-view image data (NO in step S170) or after step S172 is performed, whether or not the user has used information processing terminal 1 to select a button for notifying a family member or a friend of the multiple-view image data of interest is determined (step S174). When the user has selected a button for notifying a family member or a friend of the multiple-view image data of interest (YES in step S174), server apparatus 5 transmits information on the multiple-view image data of interest to a server managing a social network (step S176).

When the user has not selected a button for notifying a family member or a friend of the multiple-view image data of interest (NO in step S174) or after step S176 is performed, the process returns to step S160.

In step S178, server apparatus 5 transmits menu screen 802 as shown in FIG. 12 (or menu screen 804 as shown in FIG. 13) to an information processing apparatus other than information processing terminal 1 (personal computer 2, PDA 3, or portable telephone 4) (step S178). Namely, server apparatus 5 transmits data (typically, HTML data) for displaying menu screen 800 involved with image obtainment from server apparatus 5 to an information processing apparatus other than information processing terminal 1 (personal computer 2, PDA 3, or portable telephone 4). In succession, server apparatus 5 determines whether or not the user has used an information processing apparatus other than information processing terminal 1 to select any thumbnail image in menu screen 802 (step S180). When the user has selected no thumbnail image (NO in step S180), the processing in step S180 is repeated.

When the user has selected any thumbnail image (YES in step S180), server apparatus 5 transmits detailed information screen 842 as shown in FIG. 14, which is involved with the multiple-view image data corresponding to the selected thumbnail image, to an information processing apparatus other than information processing terminal 1 (step S182). In succession, server apparatus 5 determines whether or not the user has used an information processing apparatus other than information processing terminal 1 to request image transmission (downloading) of the multiple-view image data displayed in detailed information screen 842 (step S184). When the user has not requested downloading of the multiple-view image data (NO in step S184), the processing in step S184 is repeated.

When the user has requested downloading of the multiple-view image data (YES in step S184), server apparatus 5 transmits (downloads), in response to the request for image transmission (downloading) from an information processing apparatus other than information processing terminal 1, single-view image data generated from the designated multiple-view image data to the information processing apparatus other than information processing terminal 1 from which the request was made (step S186). It is noted that server apparatus 5 generates single-view image data from the multiple-view image data of interest as necessary. Then, the information processing apparatus other than information processing terminal 1 provides single-view display of an image by using the single-view image data from server apparatus 5 (step S188).

In succession, server apparatus 5 determines whether or not the user has used an information processing apparatus other than information processing terminal 1 to enter evaluation of the multiple-view image data of interest in detailed information screen 842 (step S190). When the user has entered evaluation of the multiple-view image data (YES in step S190), server apparatus 5 updates an evaluation value (value of attribute information 532) of the multiple-view image data of interest based on the entered user's evaluation value (step S192).

When the user has not entered evaluation of the multiple-view image data (NO in step S190) or after step S192 is performed, whether or not the user has used an information processing apparatus other than information processing terminal 1 to select a button for notifying a family member or a friend of the multiple-view image data of interest is determined (step S194). When the user has selected a button for notifying a family member or a friend of the multiple-view image data of interest (YES in step S194), server apparatus 5 transmits information on the multiple-view image data of interest to a server managing a social network (step S196).

When the user has not selected a button for notifying a family member or a friend of the multiple-view image data of interest (NO in step S194) or after step S196 is performed, the process returns to step S180.

H. Other Embodiments

According to another embodiment, a program for implementing the information processing system described above may be embodied. Such a program may be distributed through a network or may be provided through a non-transitory recording medium such as a CD-ROM or a DVD. Therefore, each of an information processing apparatus such as information processing terminal 1, personal computer 2, PDA 3, and portable telephone 4 as well as server apparatus 5 may be embodied as combination of a recording medium storing a program including instructions for providing each function and a processing apparatus capable of reading and executing the program stored in the recording medium. In this case, server apparatus 5 is provided with a server program including instructions for realizing various functions as described above.

According to yet another embodiment, a single information processing program may be prepared in advance in server apparatus 5, and a program of a necessary portion may be distributed to such an information processing apparatus as information processing terminal 1, personal computer 2, PDA 3, and portable telephone 4, to thereby realize each function as described above. Namely, a single information processing program for functioning each execution entity for implementing an information processing system may be embodied.

According to yet another embodiment, server apparatus 5 directed to the information processing system described above may realize a necessary function not with a single processing entity but with a plurality of processing entities in coordination. Namely, a series of processes necessary for the information processing system according to the present embodiment, like what is called a cloud system, may be realized as distributed among a plurality of processing entities. In this case, server apparatus 5 is embodied as a server system.

According to yet another embodiment, a part of processing performed in information processing terminal 1 directed to the information processing system described above may be performed by server apparatus 5. In addition, though information processing terminal 1 incorporating a display portion (display means) for providing multiple-view display of an image by using multiple-view image data has been exemplified in one example described above, a display portion capable of providing such multiple-view display may be provided as a separate entity.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. An information processing system, comprising:
a server apparatus;
at least one first information processing apparatus capable of communicating with said server apparatus; and
at least one second information processing apparatus capable of communicating with said server apparatus,
said first information processing apparatus including a first transmission portion for obtaining multiple-view image data and transmitting the multiple-view image data to said server apparatus,
said server apparatus including
a storage portion for storing said multiple-view image data received from said first information processing apparatus, and
a second transmission portion for transmitting, in response to a request for image transmission from said first information processing apparatus, stored said multiple-view image data to the first information processing apparatus from which the request was made, and transmitting, in response to a request for image transmission from said second information processing apparatus, single-view image data generated from said stored multiple-view image data to the second information processing apparatus from which the request was made,
said first information processing apparatus including a first display portion for providing multiple-view display of an image by using the multiple-view image data from said server apparatus, and
said second information processing apparatus including a second display portion for providing single-view display of an image by using the single-view image data from said server apparatus.

2. The information processing system according to claim 1, wherein
said server apparatus further includes a restriction unit for restricting reception of at least the multiple-view image data from said second information processing apparatus.

3. The information processing system according to claim 2, wherein
said restriction unit determines, in response to access from any of said first information processing apparatus and said second information processing apparatus, whether to restrict reception of at least the multiple-view image data from the information processing apparatus from which access was made, based on identification information associated with the information processing apparatus from which access was made.

4. The information processing system according to claim 3, wherein
said restriction unit determines, in response to access from any of said first information processing apparatus and said second information processing apparatus, whether to restrict reception of at least the multiple-view image data from the information processing apparatus from which access was made, based on identification information of a web browser of the information processing apparatus which made access.

5. The information processing system according to claim 2, wherein
said restriction unit allows transmission to said first information processing apparatus, in response to access from said first information processing apparatus, of data for displaying a screen involved with image transmission to said server apparatus and image obtainment from said server apparatus by said first information processing apparatus, and allows transmission to said second information processing apparatus, in response to access from said second information processing apparatus, of data for displaying a screen involved with image obtainment from said server apparatus by said second information processing apparatus.

6. The information processing system according to claim 2, wherein
said server apparatus further includes an authentication unit for performing authentication processing based on authentication information through said first information processing apparatus, and
said restriction unit permits reception only of the multiple-view image data from the first information processing apparatus approved by said authentication unit.

7. The information processing system according to claim 6, wherein
said restriction unit permits said first information processing apparatus to register said authentication information and does not permit said second information processing apparatus to register said authentication information.

8. The information processing system according to claim 2, wherein
said restriction unit allows transmission, to said first information processing apparatus, of data for displaying a log-in screen for performing authentication processing based on authentication information, while it does not allow transmission, to said second information processing apparatus, of the data for displaying said log-in screen.

9. The information processing system according to claim 1, wherein
said single-view image data is lower in resolution than corresponding multiple-view image data.

10. The information processing system according to claim 1, wherein
said server apparatus further includes an evaluation accepting unit for accepting a result of evaluation of an image shown by said stored multiple-view image data, and
said second transmission portion allows only single-view image data corresponding to the multiple-view image data of which evaluation has been entered through said evaluation accepting unit, among said stored multiple-view image data, to be transmitted to said second information processing apparatus.

11. The information processing system according to claim 1, wherein
said server apparatus further includes a generation unit for generating, when a request for image transmission is received from said second information processing apparatus, corresponding single-view image data from the requested multiple-view image data.

12. The information processing system according to claim 1, wherein
said server apparatus further includes a generation unit for generating, when the multiple-view image data is received from said first information processing apparatus, single-view image data corresponding to said multiple-view image data, said storage portion stores said multiple-view image data and the corresponding single-view image data in association with each other, and said second transmission portion transmits, in response to a request for image transmission from said second information processing apparatus, the single-view image data stored in association with said multiple-view image data to the second information processing apparatus from which the request was made.

13. The information processing system according to claim 1, wherein said first information processing apparatus further includes a plurality of image pick-up portions for obtaining multiple-view image data, and said first transmission portion transmits the multiple-view image data obtained by said plurality of image pick-up portions to said server apparatus.

14. A computing apparatus that stores multiple-view image data, the computing apparatus comprising:

a storage medium configured to store multiple-view image data of a first image;

a transceiver configured to communicate with at least a first and second computing apparatus; and a processing system that includes at least one processor, the processing system configured to:

obtain and store the multiple-view image data of the first image;

receive, using the transceiver, an image request for the first image from the first computing apparatus;

generate single-view image data of the first image based on the multiple-view image data of the first image;

transmit, using the transceiver, the generated single-view image to the first computing apparatus in response to the received image request; and transmit the multiple-view image data of the first image to the second computing apparatus in response to an image request for the first image from the second computing apparatus.

15. The computing apparatus of claim 14, wherein the single-view image data of the first image is generated in response to reception of the image request for the first image.

16. The computing apparatus of claim 14, wherein the multiple-view image data is image data for a stereoscopic image.

17. A non-transitory computer readable storage medium encoded with a computer readable information processing program that is executable by a system, the system including a server apparatus and at least one first information processing apparatus and at least one second information processing apparatus that are configured to communicate with said server apparatus, the information processing program comprising instructions that are, when executed by at least one processor of the system, configured to:

cause said first information processing apparatus to obtain multiple-view image data and transmit the multiple-view image data to said server apparatus;

cause said server apparatus to store said multiple-view image data received from said first information processing apparatus;

cause said server apparatus to transmit, in response to a request for image transmission from said first information processing apparatus, stored said multiple-view image data to the first information processing apparatus from which the request was made;

cause said server apparatus to transmit, in response to a request for image transmission from said second information processing apparatus, single-view image data generated from said stored multiple-view image data to the second information processing apparatus from which the request was made;

cause said first information processing apparatus to provide multiple-view display of an image by using the multiple-view image data from said server apparatus; and cause said second information processing apparatus to provide single-view display of an image by using the single-view image data from said server apparatus.

18. A non-transitory storage medium encoded with a computer readable server program and executable by a server apparatus, the server apparatus configured to communicate with at least one first information processing apparatus and at least one second information processing apparatus, the server program comprising computer executable instructions that are, when executed by at least one processor of the server apparatus, configured to:

receive from said first information processing apparatus, multiple-view image data obtained and transmitted to said server apparatus by said first information processing apparatus;

store the received multiple-view image data; and transmit, in response to a request for image transmission from said first information processing apparatus, stored said multiple-view image data to said first information processing apparatus from which the request was made, where the multiple-view image data provides a multiple-view display of an image; and transmit, in response to a request for image transmission from said second information processing apparatus, single-view image data generated from said stored multiple-view image data to said second information processing apparatus from which the request was made, where the single-view image data provides a single-view display of an image.

19. A server apparatus comprising:

a storage medium configured to store multiple-view image data;

a transceiver configured to communicate with the at least one first information processing apparatus and the at least one second information processing apparatus;

a processing system that includes at least one processor, the processing system configured to:

receive, using the transceiver, from said first information processing apparatus, multiple-view image data;

store the received multiple view image data to the storage medium;

transmit, using the transceiver, the stored multiple-view image data to said first information processing apparatus in response to an image request from the first information processing apparatus; and transmit, using the transceiver, single-view image data to said second information processing apparatus in response to a transmitted image request from the second information processing apparatus, the single-view image data generated from said stored multiple-view image data.

20. The server apparatus of claim 19, wherein the processing system is further configured to generate the single-view image data in response to the transmitted image request from the second information processing apparatus.

21. A server system constituted of at least one processing entity, said server system being capable of communicating with at least one first information processing apparatus and at least one second information processing apparatus, the server system comprising:
- a storage portion configured to, using the at least one processing entity, receive from said first information processing apparatus, multiple-view image data obtained and transmitted to said server system by said first information processing apparatus, and store the multiple-view image data to a storage medium; and
- a second transmission portion that is, using the at least one processing entity, configured to:
  - transmit, in response to a request for image transmission from said first information processing apparatus, said stored multiple-view image data to said first information processing apparatus from which the request was made; and
  - transmit, in response to a request for image transmission from said second information processing apparatus, single-view image data generated from said stored multiple-view image data to said second information processing apparatus from which the request was made.

22. An information processing method for use with a multiple-view image hosting server that includes at least one processor, the information processing comprising:
- receiving multiple-view image data from a first information processing apparatus;
- storing the received multiple-view image data;
- transmitting, using the at least one processor, the stored multiple-view image data to said first information processing apparatus in response to an image request from said first information processing apparatus; and
- transmitting, using the at least one processor, single-view image data that has been generated from said stored multiple-view image data to a second information processing apparatus in response to an image request from said second information processing apparatus.

23. The information processing method of claim 22, further comprising:
- generating, using the at least one processor, the single-view image data from the stored multiple-view image data.

* * * * *